(12) United States Patent
Brown

(10) Patent No.: US 6,958,308 B2
(45) Date of Patent: Oct. 25, 2005

(54) DEPOSITION OF DISPERSED METAL PARTICLES ONTO SUBSTRATES USING SUPERCRITICAL FLUIDS

(75) Inventor: Garth Desmond Brown, Marietta, GA (US)

(73) Assignee: Columbian Chemicals Company, Marietta, GA (US)

( * ) Notice: Subject to any disclaimer, the term of this patent is extended or adjusted under 35 U.S.C. 154(b) by 61 days.

(21) Appl. No.: 10/801,348

(22) Filed: Mar. 16, 2004

(65) Prior Publication Data

US 2005/0209095 A1  Sep. 22, 2005

(51) Int. Cl.⁷ .......................... B01J 21/18; B32B 15/02; B05D 7/00; C22B 15/00; H01M 4/86
(52) U.S. Cl. ...................... 502/180; 502/150; 502/185; 502/172; 502/184; 502/330; 502/337; 502/339; 502/344; 502/347; 428/402; 428/403; 427/215; 427/216; 427/217; 427/123; 427/457; 427/96; 427/115; 427/126.3; 427/126.5; 75/717; 75/720; 75/722; 75/739; 75/741; 429/40
(58) Field of Search ................................ 502/180, 185, 502/150, 172, 184, 330, 337, 339, 344, 347; 428/402, 403; 427/215–217, 457, 123, 96, 427/115, 126.3, 126.5; 75/717, 720, 722, 75/739, 741; 423/402, 403

(56) References Cited

U.S. PATENT DOCUMENTS

| | | | |
|---|---|---|---|
| 3,279,935 A | 10/1966 | Daniell et al. | 106/478 |
| 3,442,679 A | 5/1969 | Rivin et al. | 106/473 |
| 3,519,452 A | 7/1970 | Rivin et al. | 106/261 |
| 3,528,840 A | 9/1970 | Aboytes | 106/473 |
| 3,853,933 A | 12/1974 | Siciliano | 556/456 |
| 3,870,841 A | 3/1975 | Makowski et al. | 524/132 |
| 4,081,409 A | 3/1978 | McNicol et al. | 252/472 |
| 4,237,323 A | 12/1980 | Aliev et al. | 568/738 |
| 4,241,112 A | 12/1980 | Kostandov et al. | 427/213 |
| 4,552,786 A | 11/1985 | Berneburg et al. | 427/249.15 |
| 4,582,731 A | 4/1986 | Smith | 427/427 |
| 4,734,227 A | 3/1988 | Smith | 264/13 |
| 4,737,384 A | 4/1988 | Murthy et al. | 427/369 |
| 4,880,711 A | 11/1989 | Luczak et al. | 429/40 |
| 4,970,093 A | 11/1990 | Sievers et al. | 427/575 |
| 5,068,161 A | 11/1991 | Keck et al. | 429/44 |
| 5,093,439 A | 3/1992 | Epstein et al. | 525/540 |

(Continued)

FOREIGN PATENT DOCUMENTS

EP  0 466 261 A1  1/1992

(Continued)

OTHER PUBLICATIONS

Löffler et al., "Activity and Durability of Water-Gas Shift Catalysts Used for the Steam Reforming of Methanol," Journal of Power Sources, 114(1):15-20 (2003), no month.

(Continued)

Primary Examiner—J. A. Lorengo
Assistant Examiner—Patricia L. Hailey
(74) Attorney, Agent, or Firm—Needle & Rosenberg P.C.

(57) ABSTRACT

A method for producing dispersed metal particles on a substrate and the compositions produced is disclosed. A method for producing the particles comprises exposing an organometallic and a particulate substrate to supercritical or near supercritical fluid under conditions to form a mixture of the fluid and the organometallic, allowing the mixture to remain in contact with the substrate for a time sufficient to deposit dispersed organometallic onto the substrate, venting the mixture, thereby adsorbing the organometallic onto the substrate, and reducing the dispersed organometallic to dispersed metal particles with a reducing agent.

31 Claims, 12 Drawing Sheets

U.S. PATENT DOCUMENTS

| | | | |
|---|---|---|---|
| 5,152,801 A | 10/1992 | Altermatt et al. | 8/436 |
| 5,156,651 A | 10/1992 | Girardeau et al. | 8/115.6 |
| 5,250,163 A | 10/1993 | Epstein et al. | 205/777.5 |
| 5,290,483 A | 3/1994 | Kulkarni et al. | 252/500 |
| 5,316,990 A | 5/1994 | Cooper et al. | 502/5 |
| 5,334,292 A | 8/1994 | Rajeshwar et al. | 427/228 |
| 5,356,538 A | 10/1994 | Wai et al. | 210/634 |
| 5,498,372 A | 3/1996 | Hedges | 252/511 |
| 5,548,060 A | 8/1996 | Allcock et al. | 528/487 |
| 5,595,689 A | 1/1997 | Kulkarni et al. | 252/500 |
| 5,606,724 A | 2/1997 | Wai et al. | 423/3 |
| 5,639,441 A | 6/1997 | Sievers et al. | 424/9.3 |
| 5,767,036 A | 6/1998 | Freund et al. | 502/185 |
| 5,789,027 A | 8/1998 | Watkins et al. | 427/250 |
| 5,871,671 A | 2/1999 | Kinlen et al. | 252/500 |
| 5,900,029 A | 5/1999 | Belmont et al. | 8/550 |
| 5,928,419 A | 7/1999 | Uemura et al. | 106/493 |
| 5,932,144 A | 8/1999 | Shimizu et al. | 252/500 |
| 5,939,334 A | 8/1999 | Nguyen et al. | 438/607 |
| 5,976,233 A | 11/1999 | Osumi et al. | 106/31.86 |
| 5,993,996 A | 11/1999 | Firsich | 429/231.8 |
| 6,042,643 A | 3/2000 | Belmont et al. | 106/472 |
| 6,117,581 A | 9/2000 | Shelef | 429/44 |
| 6,132,491 A | 10/2000 | Wai et al. | 75/722 |
| 6,451,375 B1 | 9/2002 | Cotte et al. | 427/58 |
| 6,478,987 B1 | 11/2002 | Akita et al. | 252/500 |
| 6,494,946 B1 | 12/2002 | Belmont et al. | 106/472 |
| 6,524,383 B2 | 2/2003 | Komatsu et al. | 106/493 |
| 6,541,278 B2 | 4/2003 | Morita et al. | 438/3 |
| 6,572,227 B2 | 6/2003 | Yamashita et al. | 347/100 |
| 6,592,938 B1 | 7/2003 | Pessey et al. | 427/212 |
| 2002/0006982 A1 | 1/2002 | Kurabayashi | 523/161 |
| 2002/0020318 A1 | 2/2002 | Galloway et al. | 101/401.1 |
| 2002/0088375 A1 | 7/2002 | Komatsu et al. | 106/472 |
| 2003/0079643 A1 | 5/2003 | Tomioka et al. | 106/31.27 |
| 2003/0095914 A1 | 5/2003 | Belmont et al. | 423/449.2 |
| 2004/0042955 A1 | 3/2004 | Srinivas | 423/460 |
| 2004/0109816 A1 | 6/2004 | Srinivas et al. | 423/449.2 |
| 2004/0110051 A1 | 6/2004 | Srinivas | 429/33 |
| 2004/0110052 A1 | 6/2004 | Srinivas | 429/33 |
| 2004/0144961 A1 | 7/2004 | Srinivas | 252/500 |
| 2004/0166401 A1 | 8/2004 | Srinivas | 429/44 |
| 2004/0169165 A1 | 9/2004 | Srinivas | 252/511 |

FOREIGN PATENT DOCUMENTS

| | | |
|---|---|---|
| EP | 1 085 034 A1 | 3/2001 |
| JP | 3245850 | 11/1991 |
| JP | 8022827 | 1/1996 |
| WO | WO 01/015253 A1 | 3/2001 |
| WO | WO 03/099946 A1 | 12/2003 |
| WO | WO 03/100883 A2 | 12/2003 |
| WO | WO 03/100884 A2 | 12/2003 |
| WO | WO 03/100889 A1 | 12/2003 |

OTHER PUBLICATIONS

Morrison et al., "Step-Reaction Polymerization." *Organic Chemistry*, Fifth Edition, Sec. 36.7:1249-1252 (1987), no month.

Wei et al., "Stablization of Platinized Carbon Catalysts for PAFC," *Journal of Applied Electrochemistry*, 30:723-725 (2000), no month.

Blackburn et al., "Reactive Deposition of Conformal Palladium Films from Supercritical Carbon Dioxide Solution," *Chemistry of Materials*, 12:2625-2631, Feb. 2000.

Blackburn et al., "Deposition of Conformal Copper and Nickel Films from Supercritical Carbon Dioxide," *Science*, 294:141-145, Oct. 2001.

Cabanas et al., "A Continuous and Clean One-Step Synthesis of Nano-Particulate $Ce_{1-x}Zr_xO_2$ Solid Solutions in Near-Critical Water," *Chemical Communications*, 11:901-902 (2000), no month.

Cansell et al., "Supercritical Fluid Processing: A New Route for Material Synthesis," *Journal of Materials Chemistry*, 9:67-75 (1999), no month.

Johnston, "Safer Solutions for Chemists," *Nature*, 368:187-188, Mar. 1994.

Kaupp, "Reactions in Supercritical Carbon Dioxide," *Angewandte Chemie*, 33:1452-1455 (1994), no month.

Kordikowski et al., "Resolution of Ephedrine in Supercritical $CO_2$: A Novel Technique for the Separation of Chiral Drugs," *J. Pharm, Sci.*, 88:786-791 (1999), no month.

Long et al., "Chemical Fluid Deposition: A Hybrid Technique for Low-Temperature Metallization," *Advanced Materials*, 12:913-915 (2000), no month.

Park et al., "Formation of Nylon Particles and Fibers Using Precipitation with a Compressed Antisolvent," *Industrial & Eng. Chem. Res.*, 41:1504-1510 (2002), no month.

Shah et al., "Steric Stablization of Nanocrystals in Supercitial $CO_2$ Using Fluorinated Ligands," *J. Am Chem. Soc.*, 122:4245-4246, Apr. 2000.

Watkins et al., "Chemical Fluid Depoisition: Reactive Deposition of Platinum Metal from Carbon Dioxide Solution," *Chemistry of Materials*, 11:213-215 (1999), Jan. 199.

Watkins et al., "Polymer/Metal Nanocomposites in Supercritical $CO_2$," *Chemistry of Materials*, 7:1991-1994, Nov. 1995.

Watkins et al., "Polymerization of Styrene in Supercritical $CO_2$—Swollen Poly(chlorotrifluoroethylene)," *Macromolecules*, 28:4067-4074 (1995), no month.

Chao et al., "A Study of Polypyrrole Synthesized with Oxidative Transition Metal Ions," *Journal of Polymer Science, Part A: Polymer Chemistry*, 26:743-753 (1988), no month.

Internet website for Sigma-Aldrich for Product No. 530565, "Polyaniline (emeraldine salt)—composite with carbon black," www.sigmaaldrich.com (Apr. 6, 2004).

Internet website for Sigma-Aldrich for Product No. 530573, "Polypyrrole—composite with carbon black," www.sigmaaldrich.com (Apr. 6, 2004).

Lefebvre et al., "Electronically Conducting Proton Exchange Polymers as Catalyst Supports for Proton Exchange Membrane Fuel Cells," *Journal of Electrochemical Society*, 146(6):2054-2058 (1999), no month.

Product Brochure entitled "Raven Blacks," published by Columbian Chemicals Company, Marietta, Georgia (Oct. 1999).

Tsubokawa, "Functionalization of Carbon Black by Surface Grafting of Polymers," *Prog. Polym. Sci.*, 17:417-470 (1992), no month.

Wampler et al., "Composites of Polypyrrole and Carbon Black: Part III. Chemical Synthesis and Characterization," *Journal of Materials Research*, 10(7):1811-1822 (1995), no month.

Wei et al., "Synthesis of Highly Sulfonated Polyaniline," *Synthetic Metals*, 74:123-125 (1995), no month.

Uchida et al., "Effects of Microstructure of Carbon Support in the Catalyst Layer on the Performance of Polymer-Electrolyte Fuel Cells," *J. Electrochem. Soc.*, 143(7):2245-2252 (1996), no month.

DEPOSITION OF DISPERSED METAL PARTICLES ONTO SUBSTRATES USING SUPERCRITICAL FLUIDS

BACKGROUND OF THE INVENTION

1. Field of the Invention

This invention relates generally to deposition of dispersed particles on substrates and the resulting compositions.

2. Background

A supercritical fluid (SCF) is a substance above its critical temperature ($T_c$) and pressure ($P_c$). SCFs have been used as solvents in numerous applications, such as the polymerization of ethylene (Odian, G. G. *Principles of Polymerization*, John Wiley & Sons (1991)), decaffeination of coffee (McHugh, M. and Krukonis, V. *Supercritical Fluid Extraction*, $2^{nd}$ ed., Butterworth-Heinemann, Newton (1994)), for organic chemical reactions (Kaupp, G., "Reactions in Supercritical Carbon Dioxide," Angewandte Chemie, 33, 1452–1455 (1994); Johnson, K. P., "Safer Solutions for Chemists," Nature, 368, 187–188 (1994)), and nanocomposite synthesis (Watkins, J. J. and McCarthy, T., "Polymer/Metal Nanocomposites in Supercritical $CO_2$," Chemistry of Materials, 7, 1991 (1995); Watkins, J. J., Chemistry in Supercritical Fluid-Swollen Polymers: Direct Synthesis of Polymer/Polymer and Polymer/Metal Composites, Ph.D. in Polymer Science and Engineering, University of Massachusetts at Amherst (1997); Watkins, J. J. and McCarthy, T. J., "Polymerization of Styrene in Supercritical $CO_2$-Swollen Poly(chlorotrifluoroethylene)," Macromolecules, 28, 4067–4074 (1995); Cansell, F., Cheavlier, B., Demourgues, A., Etourneau, J., Even, C., Garrabos, Y., Pessy, V., Petit, S., Tressaud, A. and Weil, F., "Supercritical Fluid Processing: A New Route for Material Synthesis," Journal of Materials Chemistry, 9, pp. 67–75 (1999)). The applications of SCFs arise due to several of its characteristics, such as a wide range of solvent strengths and densities that can be adjusted by tuning the pressure and/or temperature.

A number of SCFs have been used as solvents and co-solvents for the production of nanoparticles and for micron-sized particles (Johnson, K. P., "Safer Solutions for Chemists," Nature, 1994, 368, 187–188; Cansell, F., et al., J. of Mat'l Chem., 1999, 9, pp. 67–75). Particle design is becoming a very important application for SCFs, especially in the pharmaceutical industry (Park, Y., Curtis, C. W., and Roberts, C. B., "Formation of Nylon Particles and Fibers Using Precipitation with a Compressed Antisolvent," Industrial & Eng. Chem. Res., 2002, 41, 1504–1510).

Rapid expansion of supercritical solutions is a process in which the material of interest is dissolved in a SCF and rapidly depressurized through a nozzle, causing an extremely rapid nucleation of the product (Park, Y., et al., 2002, 41, 1504–1510). Another common method for the production of micron-sized particles is the formation of particles from gas-saturated solutions (Park, Y., et al., 2002, 41, 1504–1510). This process consists of dissolving into a supercritical fluid a liquid material or a solution of the material. The mixture is then passed through a nozzle causing the formation of liquid droplets and the growth of particles. These methods can allow for control of the crystal structure and the size of the particle, which is important as the crystal structure can have a large impact on biological functionality (Kordikowski, A., York, P., and Latham, D., "Resolution of Ephedrine in Supercritical $CO_2$: A Novel Technique for the Separation of Chiral Drugs," J. Pharm. Sci., 1999, 88, 786; Park, Y., et al., 2002, 41, 1504–1510). These methods for precipitating particles within SCFs have been extended into polymers. In one example, micrometer sized particles and fibers of nylon 6/6 were produced by expanding polymer solutions into $SC$—$CO_2$.

U.S. Pat. No. 4,737,384 to Murthy et al., is directed to "a process for depositing a thin metal or polymer coating onto a substrate. More particularly, the process of this invention comprises the steps of: exposing a substrate at supercritical temperatures and pressures to a solution comprising a metal or polymer dissolved in water or a non-polar organic solvent, said metal or polymer being substantially insoluble in said solvent under sub-critical conditions and being substantially soluble in said solvent under super critical conditions; and, reducing the pressure, or temperature and pressure to sub-critical values, thereby depositing a thin coating of said metal or polymer on said substrate." See Summary of the Invention, col. 2, lines 11–24.

U.S. Pat. No. 5,789,027 to Watkins et al., is directed to methods for "depositing a film of material on the surface of a substrate by i) dissolving a precursor of the material into a supercritical or near-supercritical solvent to form a supercritical or near-supercritical solution; ii) exposing the substrate to the solution, under conditions at which the precursor is stable in the solution; and iii) mixing a reaction reagent into the solution under conditions that initiate a chemical reaction involving the precursor, thereby depositing the material onto the solid substrate, while maintaining supercritical or near-supercritical conditions. The invention also includes similar methods for depositing material particles into porous solids, and films of materials on substrates or porous solids having material particles deposited in them." See Abstract.

U.S. Pat. No. 6,132,491 to Wai et al., is directed to "a method for dissociating metal-ligand complexes in a supercritical fluid by treating the metal-ligand complex with heat and/or reducing or oxidizing agents is described. Once the metal-ligand complex is dissociated, the resulting metal and/or metal oxide form fine particles of substantially uniform size. In preferred embodiments, the solvent is supercritical carbon dioxide and the ligand is a β-diketone such as hexafluoroacetylacetone or dibutyldiacetate. In other preferred embodiments, the metals in the metal-ligand complex are copper, silver, gold, tungsten, titanium, tantalum, tin, or mixtures thereof. In preferred embodiments, the reducing agent is hydrogen. The method provides an efficient process for dissociating metal-ligand complexes and produces easily-collected metal particles free from hydrocarbon solvent impurities. The ligand and the supercritical fluid can be regenerated to provide an economic, efficient process." See Abstract.

U.S. Pat. No. 6,592,938 B1 to Pessey et al., is directed to "a method for coating particles thus obtained. According to the inventive method, the particles that are to be coated and at least one organo-metallic complex precursor of the coating material are brought into contact with each other in a liquid containing one or several solvents, whereby said particles are maintained in a dispersion in the liquid which is subjected to temperature conditions and supercritical pressure or slightly sub-critical pressure conditions; the precursor of the coating material is transformed in such a way that it is deposited onto the particles, whereupon the liquid is placed in temperature and pressure conditions so that it can eliminate the solvent in a gaseous state. The invention can be used to coat nanometric particles in particular." See Abstract.

The prior art does not disclose the particular advantageous steps or features of the present invention. Among other reasons, the prior art does not disclose the combination of a reducing reaction, particulate metal being formed rather than a metal film, a particulate substrate, and/or venting prior to reducing.

For the above reasons, the ability to adequately disperse particles on particulate substrates has not yet been met.

SUMMARY OF THE INVENTION

In accordance with the purpose(s) of this invention, as embodied and broadly described herein, this invention relates to deposition of dispersed particles on a substrate and the resulting composition.

In one aspect, the invention relates to a method for producing metal particles or mixed metal particles dispersed on a particulate substrate comprising
a) exposing an organometallic and the particulate substrate to a supercritical or near supercritical fluid under conditions to form a mixture of the fluid and the organometallic,
b) allowing the mixture to remain in contact with the substrate for a time sufficient to deposit dispersed organometallic onto the substrate,
c) venting the mixture,
d) thereby adsorbing the organometallic onto the substrate, and then
e) reducing the dispersed organometallic to dispersed metal particles with a reducing agent.

In another aspect, the invention relates to a method for producing particulate substrate-supported dispersed metallic particles comprising
a) mixing an organometallic in a supercritical or near supercritical fluid to form a mixture,
b) exposing a particulate substrate to the mixture of a) under supercritical or near supercritical conditions for a period of time sufficient to deposit dispersed organometallic on the substrate,
c) venting the mixture,
d) thereby adsorbing the organometallic onto the substrate, and then
e) reducing the organometallic to dispersed metal particles with a reducing agent.

In another aspect, the invention relates to a method for producing particulate substrate-supported dispersed metallic particles comprising
a) adding a particulate substrate and an organometallic to a reactor,
b) adding a supercritical fluid to the reactor to form a mixture with the organometallic,
c) allowing the organometallic to remain in contact with the substrate for a time sufficient to deposit dispersed organometallic onto the substrate,
d) venting the reactor,
e) thereby adsorbing the organometallic onto the substrate, and then
f) adding a gaseous reducing agent to the reactor, and
g) contacting the reducing agent and organometallic until the organometallic is reduced to dispersed metal particles.

In another aspect, the invention relates to a method for producing a supported particulate catalyst for use in a fuel cell comprising
a) exposing an organometallic and a particulate substrate to a supercritical or near supercritical fluid under conditions to form a mixture of the fluid and the organometallic,
b) allowing the mixture to remain in contact with the substrate for a time sufficient to deposit dispersed organometallic onto the substrate,
c) venting the mixture,
d) thereby adsorbing the organometallic onto the substrate, and then
e) reducing the dispersed organometallic to dispersed metal particles with a reducing agent thereby forming a supported particulate catalyst, wherein the supported particulate catalyst is suitable for use in a fuel cell.

In another aspect, the invention relates to a method for producing a supported particulate catalyst for use in a fuel cell with a controlled catalyst particle size comprising
a) exposing an organometallic and a particulate substrate to supercritical or near supercritical fluid under conditions to form a mixture of the fluid and the organometallic,
b) allowing the mixture to remain in contact with the substrate for a time sufficient to deposit dispersed organometallic onto the substrate,
c) venting the mixture,
d) thereby adsorbing the organometallic onto the substrate, and then
e) reducing the dispersed organometallic to dispersed metal particles with a reducing agent under pressure conditions effective to form the desired particle size thereby forming a supported particulate catalyst with controlled metal particle size.

The invention includes a composition comprising a particulate substrate material, such as carbonaceous or inorganic substrate material. The composition can further comprise dispersed particles, preferably dispersed nanoparticles, of a metallic compound or metal. In one aspect, the dispersed particles are metallic nanoparticles and the substrate is carbonaceous.

Also provided herein are particulate compositions of the present invention and particulate compositions produced by the methods of the present invention.

The present invention includes a method for the dispersion of particles, including, in one aspect, metallic or metal particles or nanoparticles, onto the surface of a substrate, such as a carbonaceous material substrate, and compositions resulting therefrom.

A device, such as a catalytic fuel cell, is disclosed comprising a catalyst comprising the particulate composition of the invention. Such a fuel cell comprises a cathode, an anode, and the other typical parts of a fuel cell.

This invention also relates to the application of dispersed metallic compounds or dispersed metals on particulate carbons in catalytic applications, such as fuel cell applications.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

a=2000 psi hydrogen reduction pressure, particle size 2.4 nm b=1000 psi hydrogen reduction pressure, particle size 2.9 nm c=500 psi hydrogen reduction pressure, particle size 3.0 nm d=100 psi hydrogen reduction pressure, particle size 3.3 nm

DESCRIPTION OF THE INVENTION

Figure 1:
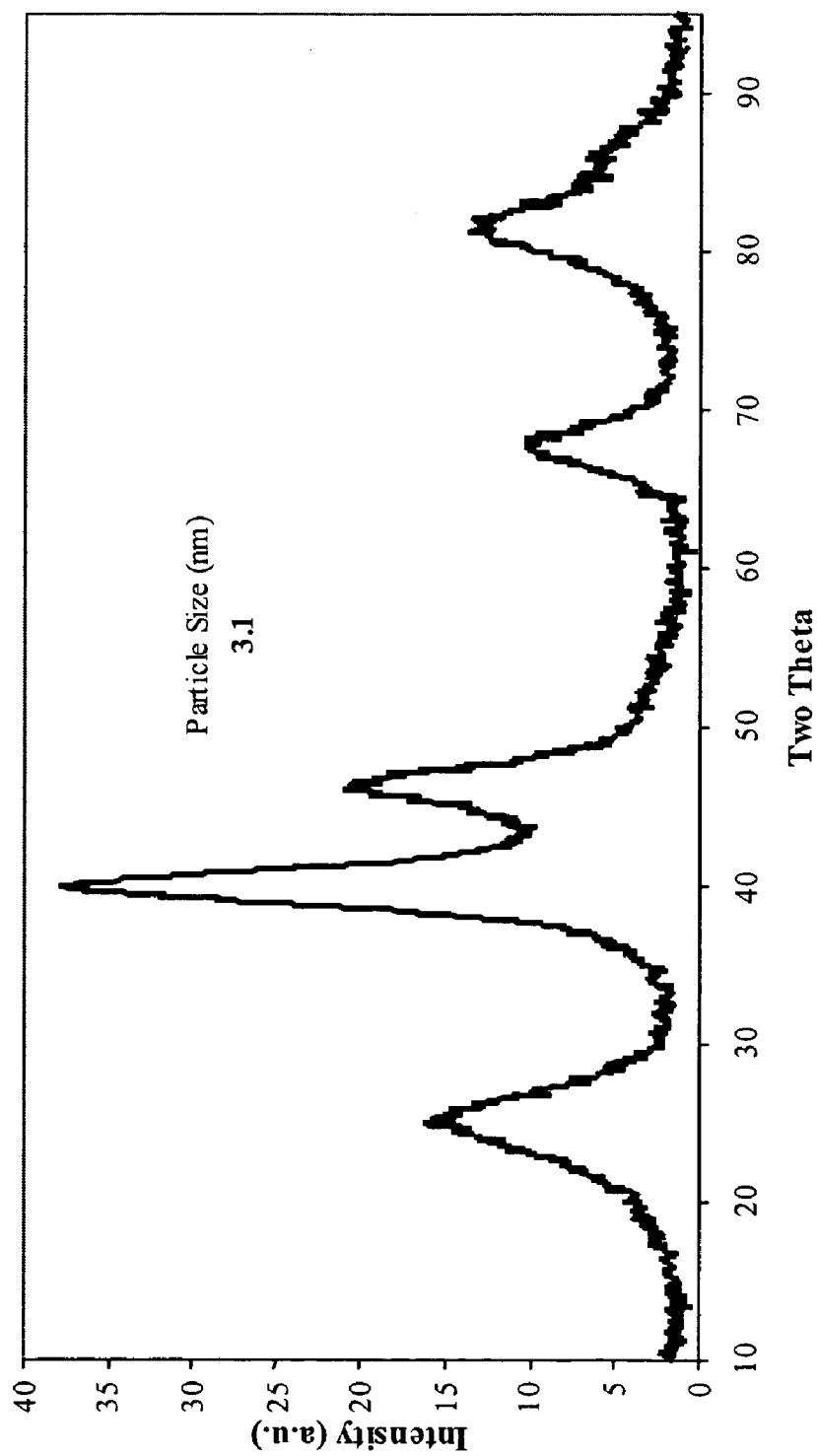
FIG. 1 is an X-ray diffraction pattern of a composition comprising platinum nanoparticles on carbon black from Example 1.

Before the present compounds, compositions, articles, devices, and/or methods are disclosed and described, it is to be understood that this invention is not limited to specific synthetic methods; specific methods may, of course, vary. It is also to be understood that the terminology used herein is for the purpose of describing particular embodiments only and is not intended to be limiting.

In this specification and in the claims which follow, reference will be made to a number of terms which shall be defined to have the following meanings:

It must be noted that, as used in the specification and the appended claims, the singular forms "a," "an," and "the" include plural referents unless the context clearly dictates otherwise. Thus, for example, reference to "an organometallic" includes mixtures of organometallics, reference to "a reducing agent" includes mixtures of two or more such reducing agents, and the like.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

References in the specification and concluding claims to parts by weight, of a particular element or component in a composition or article, denote the weight relationship between the element or component and any other elements or components in the composition or article for which a part by weight is expressed. Thus, in a composition containing 2 parts by weight of component X and 5 parts by weight component Y, X and Y are present at a weight ratio of 2:5 and are present in such ratio regardless of whether additional components are contained in the composition.

A weight percent of a component, unless specifically stated to the contrary, is based on the total weight of the formulation or composition in which the component is included.

"Optional" or "optionally" means that the subsequently described event or circumstance may or may not occur, and that the description includes instances where said event or circumstance occurs and instances where it does not.

By the term "effective amount" of a composition or property as provided herein is meant such amount as is capable of performing the function of the composition or property for which an effective amount is expressed. As will be pointed out below, the exact amount required will vary from process to process, depending on recognized variables such as the composition employed and the processing conditions observed. Thus, it is not possible to specify an exact "effective amount." However, an appropriate effective amount may be determined by one of ordinary skill in the art using only routine experimentation.

"Organometallic" means a compound which contains a metal-carbon bond. "Metallic precursor" refers to an organometallic that can be reduced to produce metal particles, i.e., reduced to zero valence metal state.

"Metal" or "metallic" as used herein can be, e.g., a precious metal, noble metal, platinum group metal, platinum, alloy or oxide of same, and a composition that includes a transition metal or oxide of same.

"Carbon black" is an acinoform carbon utilized, for example, as a particulate (defined below) substrate.

"Carbonaceous" refers to a solid material comprised substantially of elemental carbon. "Carbonaceous material" is intended to include, without limitation, i) carbonaceous compounds having a single definable structure; or ii) aggregates of carbonaceous particles, wherein the aggregate does not necessarily have a unitary, repeating, and/or definable structure or degree of aggregation.

"Particulate" means a material of separate particles.

"X-ray diffraction" (XRD) is an analysis method for determining crystallographic properties of a material, specifically as used herein the crystallite size of dispersed metal particles.

"Supercritical fluid" as used herein has the ordinary and customary meaning used in the chemical industry. Namely, it is a state of matter where the matter is under both a temperature and a pressure above their respective critical points (above both $T_c$ and $P_c$, respectively). Such a $T_c$ and $P_c$ differs depending on the particular matter, and one of skill in the art could determine from the published literature or with routine skill what such $T_c$ and $P_c$ is for a given matter.

"Near supercritical fluid" as used herein is any matter not fully in a supercritical state but is close to being in a supercritical state and which will work in the present invention by providing an adequate deposition, preferably a uniform deposition, of the organometallic on the particulate substrate. In one aspect, the matter is above $T_c$ and below but close to $P_c$, and in another aspect the matter is above $P_c$, and below but close to $T_c$. One of skill in the art could readily determine such near supercritical fluid conditions that would work in this invention. In other aspects of "near," the pressure is above the $P_c$ and the temperature (in absolute temperature units, i.e., degrees K) is at least 80%, at least 85%, at least 90%, or at least 95% of its critical point. In other aspects, the temperature is above the $T_c$ and the pressure is at least 80%, at least 85%, at least 90%, or at least 95% of its critical point.

The present invention includes methods for producing dispersed particles on a substrate and the resulting compositions.

The present invention provides a method for producing metal or mixed metal particles supported on particulate substrates. In one aspect, the substrates are carbon materials including, for example, carbon black, graphite, nanocarbons, fullerenes, finely divided carbon, or mixtures thereof.

In one aspect the method generally involves
a) mixing with or dissolving a metallic precursor(s) (organometallic(s)) in a supercritical fluid (SCF) or near supercritical fluid to form a mixture or solution, respectively,
b) exposing a substrate to the mixture or solution of a) under supercritical or near supercritical conditions,
c) venting the mixture or solution,
d) thereby adsorbing the organometallic onto the substrate, and then
e) reducing the organometallic(s) to produce dispersed and supported metal particles.

In another aspect, the invention provides a method for producing metal particles or mixed metal particles dispersed on a particulate substrate comprising
a) exposing an organometallic and the particulate substrate to a supercritical or near supercritical fluid under conditions to form a mixture of the fluid and the organometallic,
b) allowing the mixture to remain in contact with the substrate for a time sufficient to deposit dispersed organometallic onto the substrate,
c) venting the mixture,
d) thereby adsorbing the organometallic onto the substrate, and then
e) reducing the dispersed organometallic to dispersed metal particles with a reducing agent.

In another aspect, the invention provides a method for producing particulate substrate-supported dispersed metallic particles comprising
a) mixing an organometallic in a supercritical or near supercritical fluid to form a mixture,
b) exposing a particulate substrate to the mixture of a) under supercritical or near supercritical conditions for a period of time sufficient to deposit dispersed organometallic on the substrate,
c) venting the mixture,
d) thereby adsorbing the organometallic onto the substrate, and then
e) reducing the organometallic to dispersed metal particles with a reducing agent.

In another aspect, the invention provides a method for producing particulate substrate-supported dispersed metallic particles comprising
a) adding a particulate substrate and an organometallic to a reactor,
b) adding a supercritical fluid to the reactor to form a mixture with the organometallic,
c) allowing the organometallic to remain in contact with the substrate for a time sufficient to deposit dispersed organometallic onto the substrate,
d) venting the reactor,
e) thereby adsorbing the organometallic onto the substrate, and then
f) adding a gaseous reducing agent to the reactor, and
g) contacting the reducing agent and organometallic until the organometallic is reduced to dispersed metal particles.

In another aspect, the invention provides a method for producing a supported particulate catalyst for use in a fuel cell comprising
a) exposing an organometallic and a particulate substrate to a supercritical or near supercritical fluid under conditions to form a mixture of the fluid and the organometallic,
b) allowing the mixture to remain in contact with the substrate for a time sufficient to deposit dispersed organometallic onto the substrate,
c) venting the mixture,
d) thereby adsorbing the organometallic onto the substrate, and then
e) reducing the dispersed organometallic to dispersed metal particles with a reducing agent thereby forming a supported particulate catalyst.

In another aspect, the invention provides a method for producing a supported particulate catalyst for use in a fuel cell with a controlled catalyst particle size comprising
a) exposing an organometallic and a particulate substrate to supercritical or near supercritical fluid under conditions to form a mixture of the fluid and the organometallic,
b) allowing the mixture to remain in contact with the substrate for a time sufficient to deposit dispersed organometallic onto the substrate,
c) venting the mixture,
d) thereby adsorbing the organometallic onto the substrate, and then
e) reducing the dispersed organometallic to dispersed metal particles with a reducing agent under pressure conditions effective to form the desired particle size thereby forming a supported particulate catalyst with controlled metal particle size.

The synthesized product can be used as a supported catalyst, such as platinum or platinum alloys deposited on carbon black, e.g., for fuel cell applications. Unique features of the synthesis process lead to formation of a composition (e.g., supported catalyst) with different properties and advantages over the prior art.

Synthesis of the composition can begin with the addition of substrate and organometallic or organometallics to a high-pressure reactor. A supercritical (or near supercritical) fluid can be added to the reactor to dissolve the metallic precursor, which will be adsorbed to the surface of the substrate, e.g., carbon black. The reactor is subsequently vented, aiding in the sorption of the organometallic onto the surface of the substrate. A reducing agent, in one aspect a gaseous reducing agent, such as hydrogen, can be added to the reactor, thus reducing the organometallic to metal particles, e.g., nanoparticles, dispersed onto the substrate.

A surprising feature of the present invention is the ability to control particle size of the metal. Ability to control metal particle size is highly desirable in catalyst synthesis. Particle size control is desirable in catalyst applications, such as, for example, fuel cells, refineries, catalytic reforming, hydrogenation, and dehydrogenation, and other catalyst processes that use metal catalysts.

Another potential advantage of the method of the invention is its ability to produce mixed metal particles, i.e., multiple metals (two or more different metals). As used herein, such mixed metal particles' metal can be fully mixed to a homogeneous state (i.e., an alloy) or not fully mixed (heterogeneous). Using a wet chemical method, the reduction potentials of the metals must either be carefully matched for simultaneous deposition or adjusted to deposit in separate steps, thus requiring a separate alloying step, such as, for example, by heating, if an alloy is desired. Simultaneous deposition of multiple metal species in the present invention provides a significant process advantage, allowing direct alloying.

Common methods for the deposition of metal catalyst materials on a substrate are derived from "wet" chemical methods. An example of this includes the preparation of platinum on carbon black by preparation of an aqueous carbon black suspension followed by the addition of chloroplatinic acid and sodium hydroxide. A reduction agent, such as sodium borohydride, is added to deposit platinum nanoparticles on carbon black. This is then filtered, to recover the supported catalyst. Mixed metal systems can be prepared in a similar wet chemical method.

The current invention varies significantly from traditional wet chemical methods. The greatest distinguishing feature is the ability to produce higher purity products, since only four different types of reagents are needed: 1) organometallic(s), 2) substrate, 3) reduction agent, and 4) SCF.

This is in contrast to wet chemical methods that typically require several reagents in addition to carbon support and metal precursor—such as solvents, caustic, chemical reduction agents, and other additives that can contaminate the final product.

The current method also reduces the number of steps for the fabrication, which can increase the commercial viability and purity of the final product. Wet chemical methods have a large waste stream and can leave impurities on the catalyst, such as chlorides, nitrates, and/or sulfates, which can be detrimental to the performance of a final catalyst, such as in a fuel cell. The current technique can also provide ~100% yield of the metal, thus avoiding recovery and recycling issues associated with traditional wet chemical methods.

Composition

The invention includes a composition comprising a substrate and a metal.

The substrate is described below. In one aspect, the substrate is greater than about 0% to less than about 100% by weight of the composition of the present invention, for example, about 2, 5, 10, 15, 20, 25, 30, 35, 40, 45, 50, 55, 60, 65, 70, 75, 80, 85, 90, 95, 96, or 97%, where any value can comprise an upper or a lower endpoint, as appropriate. In one aspect, the substrate is about 1% to about 90% by weight of the composition, for example, about 2, 5, 10, 12, 15, 17, 20, 22, 25, 27, 30, 32, 35, 37, 40, 42, 45, 47, 50, 52, 55, 57, 60, 62, 65, 67, 70, 72, 75, 77, 80, 82, 85, 87, or 88%, where any value can comprise an upper or a lower endpoint, as appropriate. In one aspect, the substrate is about 30% to about 90% by weight of the composition, for example, about 31, 33, 34, 36, 38, 39, 41, 44, 46, 50, 51, 54, 56, 60, 61, 64, 66, 70, 71, 74, 76, 80, 81, 84, 86, or 89%, where any value can comprise an upper or a lower endpoint, as appropriate. In another aspect, the substrate is about 40% to about 80% by weight of the composition, for example, about 43, 47, 48, 49, 53, 54, 55, 57, 58, 60, 63, 65, 67, 68, 70, 73, 75, 77, 78, or 79%, where any value can comprise an upper or a lower endpoint, as appropriate, of the present invention.

The composition further comprises a metal. The metal is described below. In one aspect, the metal is about 2% to about 80% of the composition, for example, about 3, 5, 7, 8, 10, 12, 13, 15, 17, 20, 22, 25, 27, 30, 32, 35, 37, 40, 42, 45, 47, 50, 52, 55, 57, 60, 62, 65, 67, 70, 72, 75, or 78%, where any value can comprise an upper or a lower endpoint, as appropriate. In another aspect, the metal is about 10% to about 70% of the composition, for example, about 11, 12, 15, 20, 25, 30, 35, 40, 45, 50, 55, 57, 58, 59, 61, 63, 64, 66, 68, or 69%, where any value can comprise an upper or a lower endpoint, as appropriate. In yet another aspect, the metal is about 20% to about 60% of the composition for example, about 22, 23, 24, 25, 26, 28, 29, 30, 31, 33, 34, 36, 38, 39, 41, 43, 44, 46, 48, 49, 51, 53, 54, 56, or 59%, where any value can comprise an upper or a lower endpoint, as appropriate. In another aspect, the metal is loaded on the particulate substrate in an amount of from greater than 0 parts by weight to 100 parts or more by weight, in another aspect, from 10 parts by weight to 80 parts by weight, and in yet another aspect, from 20 parts by weight to 60 parts by weight, based on 100 parts by weight of the substrate. The metal can be loaded onto the substrate in different amounts depending upon the metal, the substrate, and the process conditions used. The metal can be distributed on the surface of the composition, preferably uniformly.

Substrate

In one aspect, the substrate is essentially any material which remains solid in the supercritical/near supercritical fluid and does not dissolve to any appreciable degree in the fluid. In one aspect, the substrate comprises, for example, carbonaceous material, inorganic material, or mixtures thereof. One of skill in the art will be able to determine materials appropriate for use as a substrate.

The substrate is a particulate. That is, non-particulate substrates, such as flat films, wafers, etc. are not used herein. The surface area of the substrate should be sufficient to accommodate desired loading of metal particles for intended application in a well dispersed condition. For catalytic applications, the size of the substrate and its surface area should be that which is effective for catalysis. The surface area of the substrate, in various aspects, is from 5 to 2,000 $m^2/g$ or even higher in some aspects, from 50 to 1,300 $m^2/g$, or from 150 to 1,300 $m^2/g$.

The substrate can be a particulate carbonaceous material. The carbonaceous material can be any particulate, substantially carbonaceous material. It is preferable that the material have a "reasonably high" surface area. For example, carbon black, graphite, nanocarbons, fullerenes, fullerenic material, finely divided carbon, or mixtures thereof can be used.

The substrate can be an inorganic material. The inorganic material can be any particulate inorganic material. It is preferable that the material have a "reasonably high" surface area, such as those materials routinely used as catalyst supports.

Carbon Black

In one aspect, the carbonaceous material comprises carbon black. The choice of carbon black in the invention is not critical. Any carbon black can be used in the invention. For example, in various aspects, carbon blacks with a surface area (as used herein for carbon black, surface area means nitrogen surface area ("NSA"), and as used herein for carbon black is, unless stated to the contrary, measured by ASTM D6556) of about 5 to about 2000 $m^2/g$, for example, about 5, 10, 50, 100, 200, 220, 240, 250, 300, 350, 400, 450, 500, 550, 600, 650, 700, 750, 800, 850, 950, 1,000, 1,300, 1,500, or 2,000 $m^2/g$ is used, where any value can comprise an upper or a lower endpoint, as appropriate. In other aspects, a carbon black with a surface area of from 200 to 280, or from 1,000 to 1,500 $m^2/g$ is used. In other aspects, carbon black with a surface area of from 230 to 250 or from 1,100 to 1,300 is used. It is preferred that the carbon black have surface area effective for metal dispersion. It is preferred that the carbon black have structure effective for gas diffusion.

In one aspect, the carbon black is greater than about 0% to less than about 100% by weight of the composition of the present invention, for example, about 2, 5, 10, 15, 20, 25, 30, 35, 40, 45, 50, 55, 60, 65, 70, 75, 80, 85, 90, 95, 96, or 97%, where any value can comprise an upper or a lower endpoint, as appropriate. In another aspect, the carbon black is about 1% to about 90% by weight of the composition, for example, about 2, 5, 10, 12, 15, 17, 20, 22, 25, 27, 30, 32, 35, 37, 40, 42, 45, 47, 50, 52, 55, 57, 60, 62, 65, 67, 70, 72, 75, 77, 80, 82, 85, 87, or 88%, where any value can comprise an upper or a lower endpoint, as appropriate. In another aspect, the carbon black is about 30% to about 90% by weight of the composition, for example, about 31, 33, 34, 36, 38, 39, 41, 44, 46, 50, 51, 54, 56, 60, 61, 64, 66, 70, 71, 74, 76, 80, 81, 84, 86, or 89%, where any value can comprise an upper or a lower endpoint, as appropriate. In another aspect, the carbon black is about 40% to about 80% by weight of the composition, for example, about 43, 47, 48, 49, 53, 54, 55, 57, 58, 60, 63, 65, 67, 68, 70, 73, 75, 77, 78, or 79%, where any value can comprise an upper or a lower endpoint, as appropriate, of the present invention.

Those skilled in the art will appreciate that carbon black particles have properties which are primarily determined by the particle and aggregate size, aggregate shape, degree of graphitic order, and surface chemistry of the particle.

One of skill in the art could readily choose an appropriate carbon black for a particular application.

Carbon blacks are commercially available (e.g., Columbian Chemicals Company, Marietta, Ga., USA).

Other Carbonaceous Material

In one aspect, the particulate carbonaceous material comprises a material other than carbon black. The choice of other carbonaceous material in the invention is not critical. Any substantially carbonaceous material can be used in the invention. For example, graphite, nanocarbons, fullerenes, fullerenic material, finely divided carbon, or mixtures thereof can be used.

It is preferred that the carbonaceous material have a surface area effective for metal dispersion. It is preferred that the carbonaceous material have structure effective for gas diffusion.

One of skill in the art could readily choose a carbonaceous material for a particular application. These carbonaceous materials are commercially available.

In one aspect, the carbonaceous material is greater than about 0% to less than about 100% by weight of the composition of the present invention, for example, about 2, 5, 10, 15, 20, 25, 30, 35, 40, 45, 50, 55, 60, 65, 70, 75, 80, 85, 90, 95, 96, or 97%, where any value can comprise an upper or a lower endpoint, as appropriate. In another aspect, the carbonaceous material is about 1% to about 90% by weight of the composition, for example, about 2, 5, 10, 12, 15, 17, 20, 22, 25, 27, 30, 32, 35, 37, 40, 42, 45, 47, 50, 52, 55, 57, 60, 62, 65, 67, 70, 72, 75, 77, 80, 82, 85, 87, or 88%, where any value can comprise an upper or a lower endpoint, as appropriate. In another aspect, the carbonaceous material is about 30% to about 90% by weight of the composition, for example, about 31, 33, 34, 36, 38, 39, 41, 44, 46, 50, 51, 54, 56, 60, 61, 64, 66, 70, 71, 74, 76, 80, 81, 84, 86, or 89%, where any value can comprise an upper or a lower endpoint, as appropriate. In another aspect, the carbonaceous material is about 40% to about 80% by weight of the composition, for example, about 43, 47, 48, 49, 53, 54, 55, 57, 58, 60, 63, 65, 67, 68, 70, 73, 75, 77, 78, or 79%, where any value can comprise an upper or a lower endpoint, as appropriate, of the present invention.

Noncarbonaceous Substrates

Other particulate substrates can be used in the present invention. For example, materials that are used as catalyst supports can be used, e.g., silica, alumina, clay, zeolite, metal oxide, or mixtures thereof.

It is preferred that an inorganic material have surface area effective for metal dispersion. It is preferred that an inorganic material have structure effective for gas diffusion.

One of skill in the art could readily choose an inorganic material for a particular application. Typically, these inorganic materials are commercially available.

In one aspect, the inorganic material is greater than about 0% to less than about 100% by weight of the composition of the present invention, for example, about 2, 5, 10, 15, 20, 25, 30, 35, 40, 45, 50, 55, 60, 65, 70, 75, 80, 85, 90, 95, 96, or 97%, where any value can comprise an upper or a lower endpoint, as appropriate. In another aspect, the inorganic material is about 1% to about 90% by weight of the composition, for example, about 2, 5, 10, 12, 15, 17, 20, 22, 25, 27, 30, 32, 35, 37, 40, 42, 45, 47, 50, 52, 55, 57, 60, 62, 65, 67, 70, 72, 75, 77, 80, 82, 85, 87, or 88%, where any value can comprise an upper or a lower endpoint, as appropriate. In another aspect, the inorganic material is about 30% to about 90% by weight of the composition, for example, about 31, 33, 34, 36, 38, 39, 41, 44, 46, 50, 51, 54, 56, 60, 61, 64, 66, 70, 71, 74, 76, 80, 81, 84, 86, or 89%, where any value can comprise an upper or a lower endpoint, as appropriate. In another aspect, the inorganic material is about 40% to about 80% by weight of the composition, for example, about 43, 47, 48, 49, 53, 54, 55, 57, 58, 60, 63, 65, 67, 68, 70, 73, 75, 77, 78, or 79%, where any value can comprise an upper or a lower endpoint, as appropriate, of the present invention.

Organometallic/Metal

An organometallic (metallic precursor) is used in a method of the invention. The organometallic can be, for example, 1,5-cyclooctadiene dimethyl platinum [Pt(COD)Me$_2$], (1,5-cyclooctadiene) (hexafluoroacetylacetonato) silver [Ag(COD)hfac], ruthenium acetylacetonate [Ru(acac)$_3$], or Ag(acac), or mixtures thereof. Additional examples of an organometallic include diethylzinc or diethylnickel; Grignard compounds, such as methyl magnesium iodide; metallic alkyls, such as butyllithium, tetraethyllead, triethyl aluminum, tetrabutyl titanate, and sodium methylate; phthalocyanines, such as copper phthalocyanines; and metallocenes. The organometallic is typically soluble in the supercritical fluid and easily reducible to metal.

A composition of the present invention can further comprise a metal as defined above. The organometallic comprises the metal. In one aspect, the metal is a precious metal, noble metal, platinum group metal, platinum, alloy or oxide of same, or a composition that includes a transition metal or oxide of same. In one aspect, the metal is platinum, iridium, osmium, rhenium, ruthenium, rhodium, palladium, vanadium, chromium, gold, silver, nickel, cobalt, or a mixture thereof, or an alloy thereof. In one aspect, the metal is platinum or silver.

As defined above, the metal can be an alloy or heterogeneous mixture, such as those effective as catalysts.

The metal in the final composition is typically in the form of dispersed particles on the substrate. Thus, the present invention produces a dispersed metal particle on a particulate substrate. In one aspect, the metal is in nanoparticle form. For example, in one aspect, the metal particles are less than or equal to about 20 nm average diameter. In another aspect, the metal particles are about 0.5 nm to about 10 nm average diameter, in another aspect, about 1 nm to 10 nm average diameter, and in another aspect, about 0.5 nm to about 5 nm average diameter. The metal particle size produced by the processes of the present invention are typically 20 nm average diameter or less. However, high organometallic loadings could lead to higher sized metal particles. For catalyst applications, deposition of nanometer sized metal particles is especially preferred rather than a metal film for enhanced catalytic activity and less waste of metal material.

Not wishing to be bound by theory, it is believed that the present invention produces a dispersed particulate metal of substantially discrete particles on a substrate rather than a continuous metal film on a substrate due, at least in part, to the particulate nature of the substrate. More specifically, it is believed that such particulate substrate's high surface area causes the metal to form as a particle rather than a film. Although conditions can theoretically be manipulated in a non-particulate substrate process to potentially produce a particulate metal on the substrate, such non-particulate substrate processes favor a metal film production on the substrate. Conversely, in the present invention, a metal particulate is favored by the typical reaction conditions and the use of a particulate substrate.

The amount of metal can be any amount. The amount of metal can be an effective catalytic amount.

The amount of organometallic can be that which achieves a desired final metal loading after reduction. One of skill in the art can determine an amount of organometallic (and corresponding metal) effective for the desired performance in the intended application. In one aspect, the organometallic is added in an amount of from greater than 0% to 100% saturation, in another aspect from 60 to 100% saturation, of the organometallic solubility level in the supercritical or near supercritical fluid. In another aspect, the amount of organometallic is added in an amount of greater than the 100% saturation amount of the organometallic solubility level in the fluid, e.g., at from 101% to 150% or even higher.

In one aspect, the metal is about 2% to about 80% of the composition, for example, about 3, 5, 7, 8, 10, 12, 13, 15, 17, 20, 22, 25, 27, 30, 32, 35, 37, 40, 42, 45, 47, 50, 52, 55, 57, 60, 62, 65, 67, 70, 72, 75, or 78%, where any value can comprise an upper or a lower endpoint, as appropriate. In another aspect, the metal is about 10% to about 70% of the composition, for example, about 11, 12, 15, 20, 25, 30, 35, 40, 45, 50, 55, 57, 58, 59, 61, 63, 64, 66, 68, or 69%, where any value can comprise an upper or a lower endpoint, as appropriate. In another aspect, the metal is about 20% to about 60% of the composition for example, about 22, 23, 24, 25, 26, 28, 29, 30, 31, 33, 34, 36, 38, 39, 41, 43, 44, 46, 48, 49, 51, 53, 54, 56, or 59%, where any value can comprise an upper or a lower endpoint, as appropriate. The metal can be uniformly distributed on the composition, e.g., on the surface of the composition.

One of skill in the art could readily choose an organometallic (and corresponding metal) to use in the composition for a particular application. Organometallics are commercially available or readily prepared by one of ordinary skill in the art.

The metal is dispersed on the substrate. It is preferred that the metal be essentially uniformly dispersed on the substrate.

Supercritical/Near Supercritical Fluid

A supercritical fluid (SCF) is a substance above its critical temperature ($T_c$) and pressure ($P_c$). SCFs have been used as solvents in numerous applications. The applications of SCFs arise due to several of their characteristics, such as a wide range of solvent strengths and densities that can be adjusted by tuning the pressure and/or temperature.

Carbon dioxide ($CO_2$) is the most widely used SCF as the solvent is inexpensive, nontoxic, nonflammable and environmentally benign. It has a readily accessible critical temperature and pressure ($T_c$=31.06° C. and Pc=1070 psi) (NIST, NIST Chemistry WebBook, 2003, http://webbook.nist.gov/chemistry/). The properties of SCFs are coupled to density and controlled by variations in temperature and pressure. Density isotherms of $CO_2$ can be generated from data in McHugh, M. and Krukonis, V. *Supercritical Fluid Extraction*, $2^{nd}$ ed., Butterworth-Heinemann, Newton (1994). Below $T_c$, a discontinuity in the density occurs as a phase boundary is observed, where above $T_c$ continuous changes in density are observed. Densities approaching or exceeding those of liquid organic solvents (~0.7–0.9 g/mL) can be obtained with supercritical $CO_2$ (SC—$CO_2$) while retaining desirable properties of gases, such as high diffusion rates and zero surface tension, which facilitate deposition of the organometallic on the substrate surface. Typical ranges of SCFs are summarized in Table 1, while specific examples are given in Table 2.

TABLE 1

General physical properties of Liquids, Gases, and SCFs (McHugh, M. and Krukonis, V. Supercritical Fluid Extraction, $2^{nd}$ ed., Butterworth-Heinemann, Newton (1994))

|  | Liquid | Gas | SCF |
| --- | --- | --- | --- |
| Density (g/cc) | 1.0 | 0.001 | 0.1–1.0 |
| Viscosity (Pa*s) | $10^{-3}$ | $10^{-5}$ | $10^{-4}$–$10^{-3}$ |
| Diffusion (cm²/s) | $10^{-5}$ | $10^{-1}$ | $10^{-2}$ |

TABLE 2

Critical points of common SCFs (NIST, NIST Chemistry WebBook, 2003 http://webbook.nist.gov/chemistry/).

|  | $T_c$ (° C.) | $P_c$ (psi) | $\rho_c$ (g/cc) |
| --- | --- | --- | --- |
| Carbon dioxide | 31 | 1070 | 0.46 |
| Ethane | 32 | 708 | 0.21 |
| Ethylene | 9 | 731 | 0.22 |
| Propane | 97 | 616 | 0.22 |
| Propylene | 92 | 670 | 0.23 |
| Chlorotrifluoromethane | 29 | 569 | 0.56 |
| Ammonia | 133 | 1636 | 0.23 |
| Water | 374 | 3202 | 0.32 |

A supercritical or near supercritical fluid is used in a method of the present invention. The supercritical or near supercritical fluid mixes with the organometallic to form a mixture of the organometallic and the fluid. In another aspect, the mixture is a dispersion of the organometallic in the fluid. In another aspect, at least some of the organometallic dissolves in the fluid to form a partial solution. In another aspect, all or substantially all of the organometallic dissolves in the fluid to form a solution. In yet another aspect, the amount of organometallic added to the system is an amount that would be above the solubility limits for the fluid. In such a case, equilibrium will be established, whereby the organometallic would come in and out of solution. In that case, it would be expected that at least some of the organometallic that comes out of solution would adsorb directly on the particulate substrate even prior to the venting step. In yet another aspect, the amount of organometallic is added to the system in an amount that would overload the system. In that case, the undissolved organometallic is preferably mechanically mixed with the fluid. It is to be understood that the organometallic may not solubilize in the fluid as individual molecules but may solubilize as aggregates or clumps of organometallics. The supercritical or near supercritical fluid preferably dissolves the organometallic but preferably not the substrate to any appreciable degree.

The supercritical or near supercritical fluid also typically disperses the organometallic particle on the particulate substrate and provides a more uniform deposition of the organometallic than a wet solvent method. One of skill in the art can readily choose a supercritical or near supercritical fluid to use in the method for a particular application. The supercritical or near supercritical fluid can comprise a single composition or more than one composition (such as a mixture). Such compositions useful for the supercritical or near supercritical fluids are commercially available or readily prepared by one of skill in the art.

The amount of supercritical or near supercritical fluid used in a method of the present invention is an amount sufficient to mix with or dissolve the organometallic. The amount of supercritical or near supercritical fluid is an effective amount. In one aspect, the amount of supercritical fluid is, for example, from about 97 to about <100 wt. % supercritical fluid to from about >0% to about 3% solids, based upon the total weight of the solids plus supercritical fluid. In another aspect, the total solids is from 1% to 3%. In some aspects, the total solids can be higher, such as 5%, 10%, or even higher, where any value can comprise an upper or a lower endpoint, as appropriate. The amount of supercritical fluid and solids will vary with the particular reagents and conditions used taking into account the solubility limits of the solute and solvent and the stirrable viscosities. One of skill in the art would be able to determine the amount of supercritical or near supercritical fluid to use for a particular set of components and conditions.

Composition Applications

A composition of the present invention can be utilized as a supported catalyst. For example, the composition can be a supported catalyst used as an electrode, such as in a fuel cell.

A method for making a composition of the present invention, e.g., supported catalyst, is described below.

In the present invention, a method of the invention aids the uniform dispersion of metal on the substrate.

The invention includes various devices utilizing the composition, such as an electrode or a fuel cell comprising the electrode.

Method

The substrate, organometallic, and supercritical or near supercritical fluid are described above in detail under the COMPOSITION section. The reduction is described in detail below.

The supercritical (or near supercritical) conditions are determined by the composition used for the supercritical or near supercritical fluid, as different fluids require different pressure and/or temperature conditions to be in a supercritical (or near supercritical) state. The choice of fluid should be one which will reach supercritical (or near supercritical) conditions at a pressure and/or temperature that will not adversely affect the substrate, organometallic, or the reaction vessel for carrying out the method.

The amount of each component is described above and below in the REDUCTION section.

The order in which the organometallic, supercritical or near supercritical fluid, and substrate are contacted is not critical. The same composition is expected from whatever permutation of addition order is used or if the three components are added simultaneously. Thus, "exposing an organometallic and the particulate substrate to a supercritical or near supercritical fluid under conditions to form a mixture of the fluid and the organometallic" intends any order of addition of the organometallic, particulate substrate, and supercritical or near supercritical fluid.

The time required for contact between the organometallic, supercritical or near supercritical fluid, and substrate will vary. The time for the solution to form and dispersion to occur can be readily determined by one of ordinary skill in the art. For example, the time can be based at least in part on solubility and partition coefficients.

The components can be stirred. For example, this can be accomplished by movement of the components whether by mechanical stirring, convection, fluid flow, or other devices or processes.

It will be appreciated by one of ordinary skill in the art that the optimum reaction conditions and time for the formation of the composition will, of course, vary depending on the particular fluid, organometallic, and/or the particular substrate material selected to be used. Determining such optimum conditions and time can be readily achievable by one of ordinary skill in the art or otherwise can be obtained through no more than routine experimentation.

The adsorbing of the organometallic onto the substrate typically occurs when the organometallic is first brought into contact with the substrate, when the system is vented, or both. Typically, some adsorption occurs in the contacting step but the majority occurs upon venting the system, which causes the organometallic to become less mixable, less dispersible, less soluble, or insoluble in the supercritical fluid and to adsorb onto the substrate. The adsorption creates a metal to substrate bond, typically chemical adsorption, physical adsorption, or physisorption.

The venting step can be carried out by opening a vent to the reaction vessel, for example. The venting step decreases pressure of the system. The venting should preferably be performed to vent the system to at or below the pressure whereby the organometallic is no longer mixable, dispersible, or soluble in the fluid. In one aspect, the system is vented to atmospheric pressure or near atmospheric pressure. The speed of venting is not believed to be critical.

The venting step is performed prior to the reducing step, so that the organometallic is adsorbed onto the substrate prior to the reduction reaction. Not wishing to be bound by theory, it is believed that in prior art processes, the reducing step is performed first followed by the venting step. This results in the organometallic reacting with the reducing agent to form a seed. This process causes other mobile reduced organometallic particles to migrate to or near the seed to form a continuous film. Conversely, in the process of the instant invention, the venting is performed first and then the reducing step is performed. By this process, substantially discrete metal particles are formed rather than a continuous metal film, because the venting step eliminates the mobility of the particles by first adsorbing the organometallic particles onto the surface, where they are rendered immobile, and then they are reduced. A continuous film is thus not formed by the process of the instant invention. Thus, again, not wishing to be bound by theory, it is believed that the venting prior to reducing, and to at least some extent, the use of a particulate substrate, which typically has a high surface area, creates a metal particle on the particulate substrate, rather than a metal film on a substrate.

A method of the present invention can be carried out in a reaction vessel such as a stainless steel reactor. The apparatus should be compatible with the materials and reaction conditions to be used. The vessel can contain a stirring apparatus.

The methods of the invention can be carried out in continuous or batch process. In certain aspects, the invention reaction times can be decreased over the reaction times shown in the Examples below. The process is easily scaleable and can be used in a continuous processes to increase commercial viability.

One potential aspect of the processes of the invention is in a continuous spraying process. As a batch process, the pressure is dropped to allow the organometallic(s) to come out of the mixture or solution and be sorbed to the carbon black. In a continuous process, in one aspect, the pressure is dropped via spraying a slurry of the particulate substrate, such as, in one aspect, carbon black, in a SCF containing the dissolved organometallic. The sudden pressure drop allows for rapid sorption of the organometallic on the substrate. This is then collected and further treated with reduction agents, such as hydrogen, to produce the final product, such as a catalyst.

Reduction

Reducing the organometallic to metal can be achieved by addition of a reducing agent. It is preferred that the reducing agent be gaseous.

A reducing agent can be used to reduce the metal to metallic form. Various reducing agents are known in the art. These reducing agents are readily commercially available or readily synthesized by methods known to one of skill in the art. The choice of the appropriate reducing agent is readily determined by one of skill in the art for the desired application. Examples of reducing agents that can be used include, but are not limited to, hydrogen, hydrogen sulfide, formaldehyde, sodium borohydride, hydrazine, hydroxylamine, or a combination of reducing agents.

The amount of reducing agent for the current method is typically a molar excess to the organometallic.

In certain aspects, pressure conditions, can be varied to control the particle size of the reduced metal. Typically, as the pressure is increased, the particle size can be reduced.

EXAMPLES

The following examples are put forth so as to provide those of ordinary skill in the art with a complete disclosure and description of how the compounds, compositions, articles, devices, and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric.

Example 1

Platinization of Carbon Black 54.6 mg of CDX-975 carbon black (Columbian Chemicals Company, Marietta, Ga., USA)—

| CDX-975 "typical" properties | |
|---|---|
| Property | Value |
| Mean particle size (nm) ASTM D3849 | 21 |
| NSA surface area ($m^2/g$) ASTM D6556 (formerly D4820) | 240 |
| STSA surface area ($m^2/g$) ASTM D6556 (formerly D5816) | 130 |
| DBPA oil absorption (cc/100 g) ASTM D2414 | 168 |
| % volatile | 1.0 |
| Blackness index | 112 |
| Tint strength ASTM D3265 | 87 |

—and 27.7 mg of 1,5-cyclooctadiene dimethyl platinum ($Pt(COD)Me_2$) (Aldrich Chemicals, Milwaukee, Wis.) were added to a stainless steel reactor and sealed. The reactor was then placed in a constant temperature bath at 60° C. 11.51 g Coleman grade carbon dioxide (Holox, Norcross, Ga.) was added to the reactor via a computer controlled syringe pump (ISCO, Lincoln, Nebr.) to a final pressure of 2000 psi giving a 0.24 wt % solution of $Pt(COD)Me_2$.

The sample was allowed to soak, with stirring, for 23 hours, after which the solution was vented through an activated carbon bed to atmospheric pressure.

Hydrogen was then added to the reactor via a pressure drop of a high-pressure manifold to an effective pressure of 600 psi for 1 hour at 60° C. Upon venting the system, the reactor was opened and the sample was analyzed via wide angle X-ray diffraction, transmission electron microscope (TEM) and ash analysis.

Wide angle X-ray diffraction results are shown in FIG. 1. This shows a platinum (111) peak at 40 degrees two theta and yielded an average platinum crystallite size of 3.1 nm.

Figure 2:
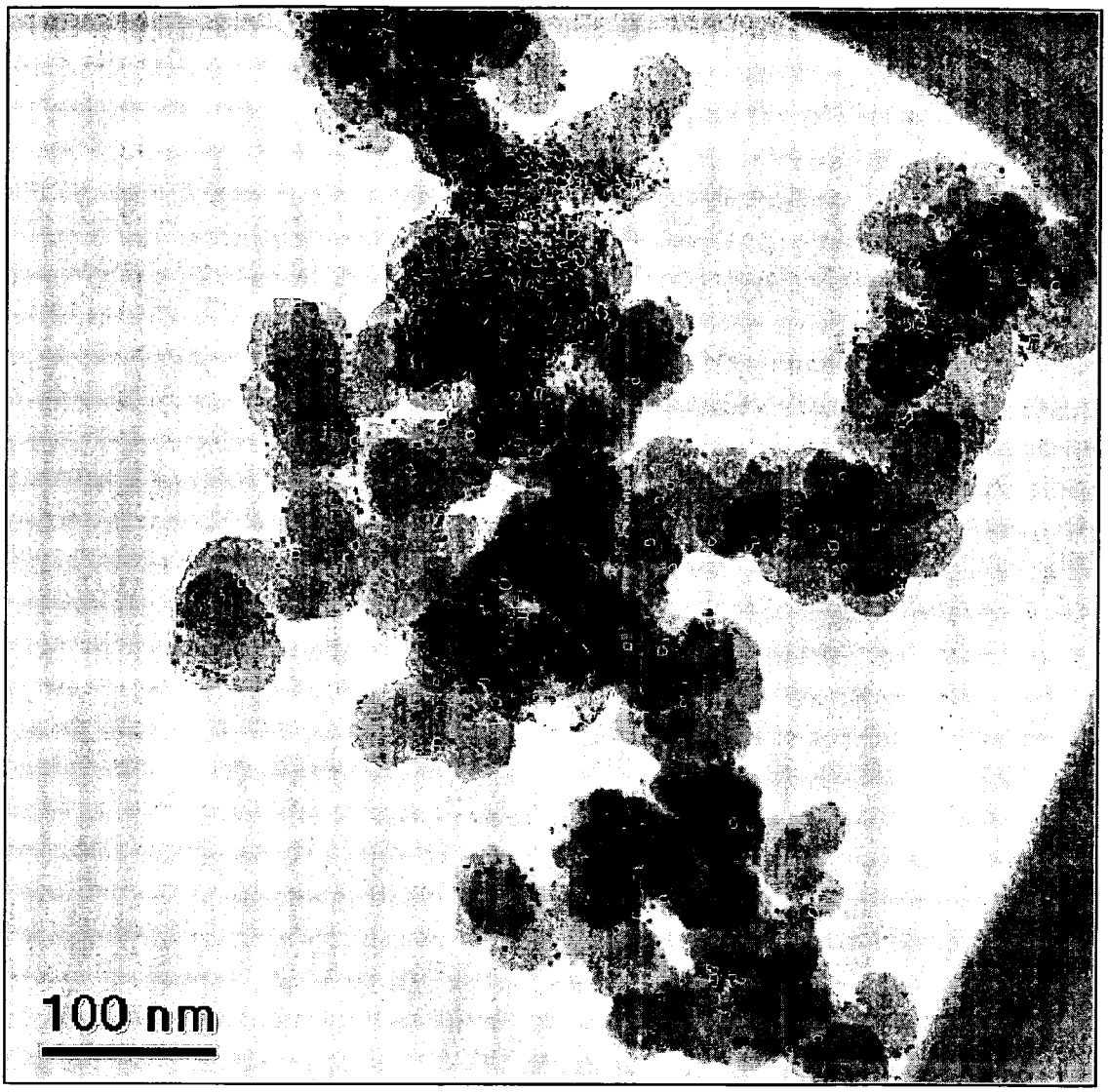
FIG. 2 is a transmission electron microscope (TEM) image of a composition from Example 1 showing platinum nanoparticles on carbon black on a 100 nm scale.
Figure 3:
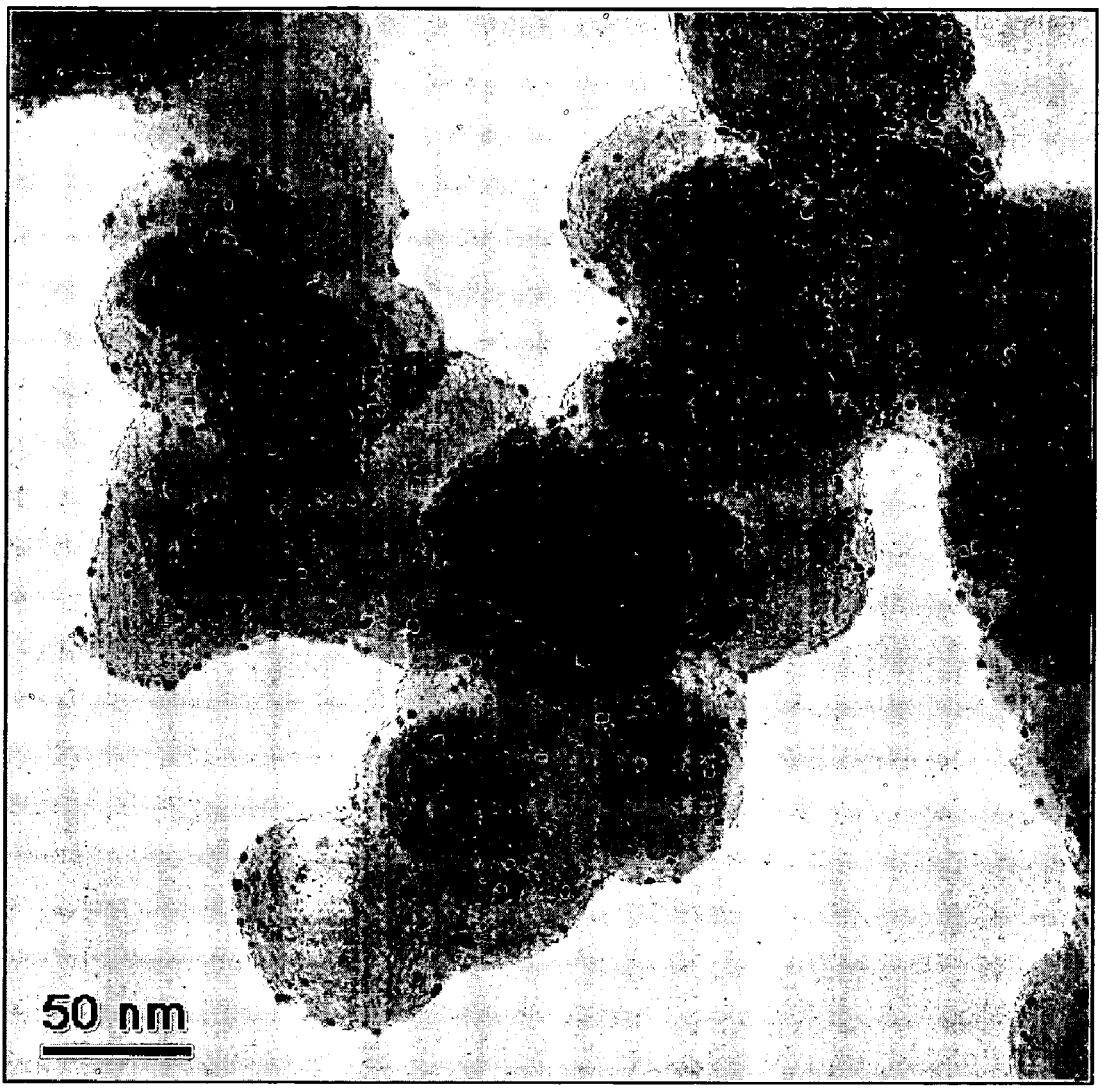
FIG. 3 is a TEM image of a composition from Example 1 showing platinum nanoparticles on carbon black on a 50 nm scale.
Figure 4:
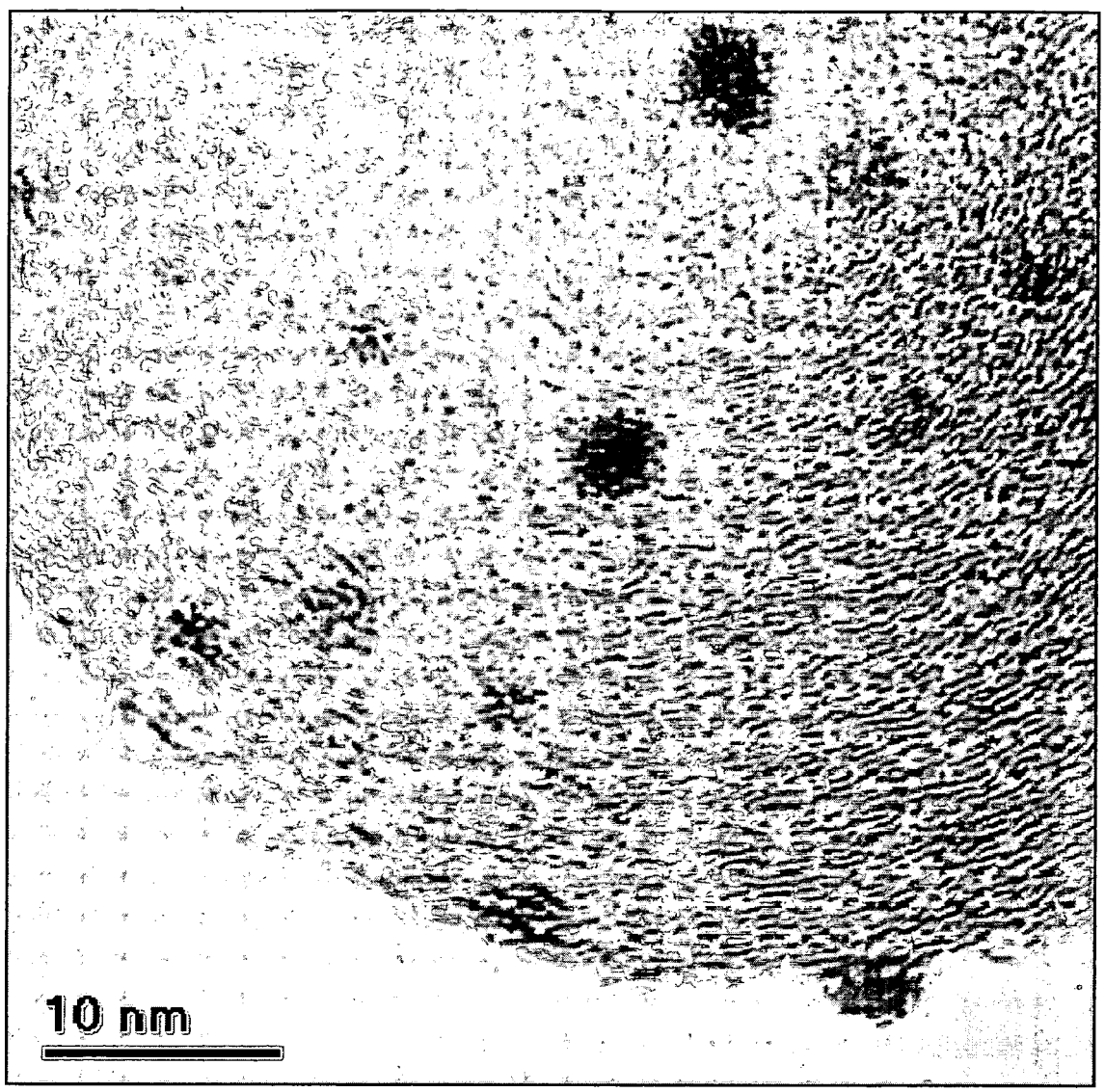
FIG. 4 is a TEM image of a composition from Example 1 showing platinum nanoparticles on carbon black on a 10 nm scale.

Three TEM pictures are shown from this sample in FIG. 2–FIG. 4 at different magnifications.

Ashing by thermogravimetric analysis gave a final platinum loading on carbon black of 15.9%.

Example 2

Influence of Hydrogen Reduction Pressure on Pt Nanoparticle Size

Another interesting feature was the influence of hydrogen reduction pressure on platinum nanoparticle size.

High-pressure reactors were loaded with 50.0±2 mg of CDX-975 and 10.0±1 mg of $Pt(COD)Me_2$ and sealed. The reactor was then placed into a constant temperature bath at 60° C.

Carbon dioxide was added to the reactor via a computer controlled syringe pump to a final pressure of 2000 psi.

The reactors were allowed to soak for 24 hours, after which the solution was vented through an activated carbon bed to atmospheric pressure.

Hydrogen (Holox) was added to the reactor at 25° C. via a pressure drop of a high-pressure manifold to different pressures and allowed to soak for 1 hour.

Figure 5:
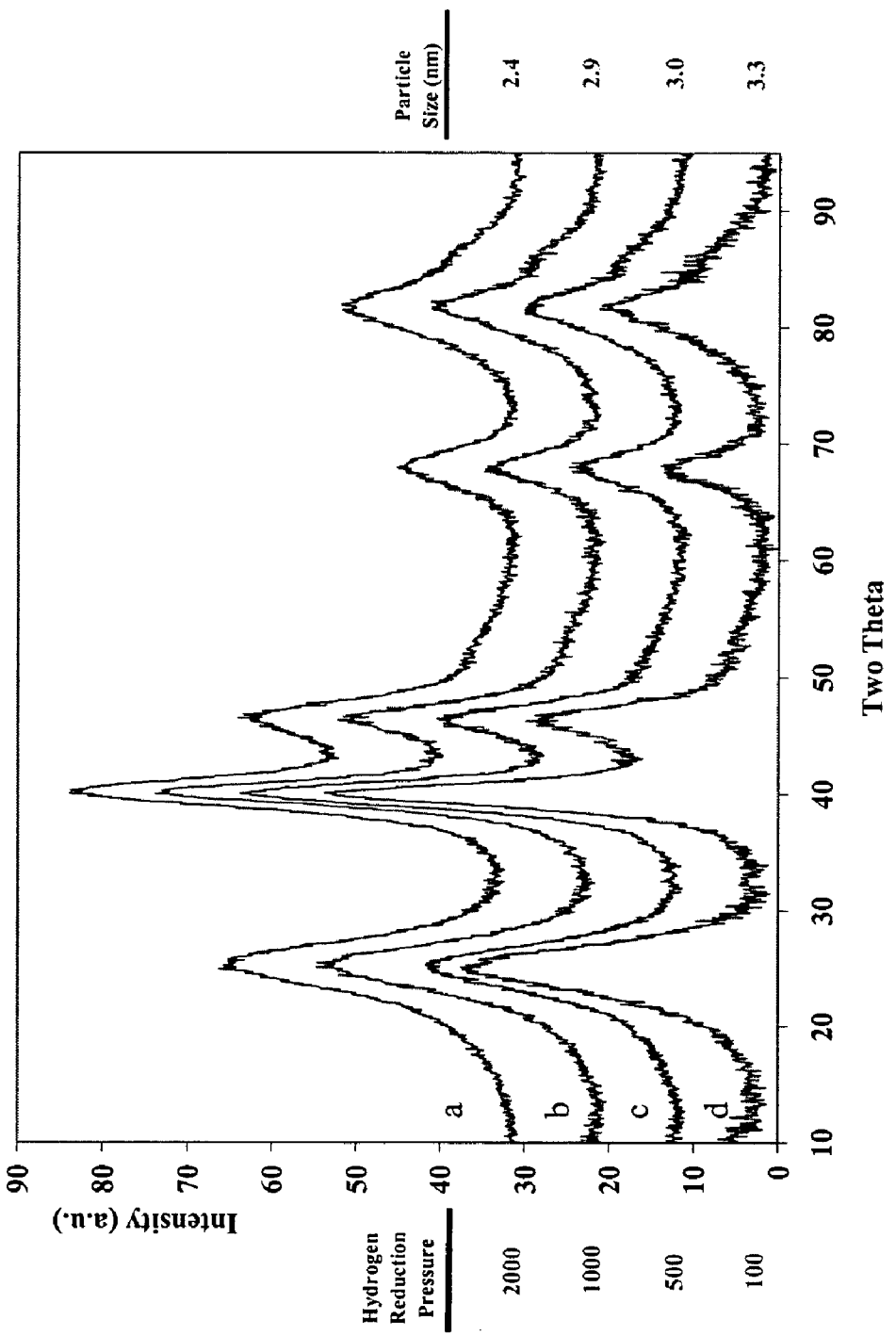
FIG. 5 are X-ray diffraction patterns of compositions from Example 2 reduced under different hydrogen pressures.
Figure 6:
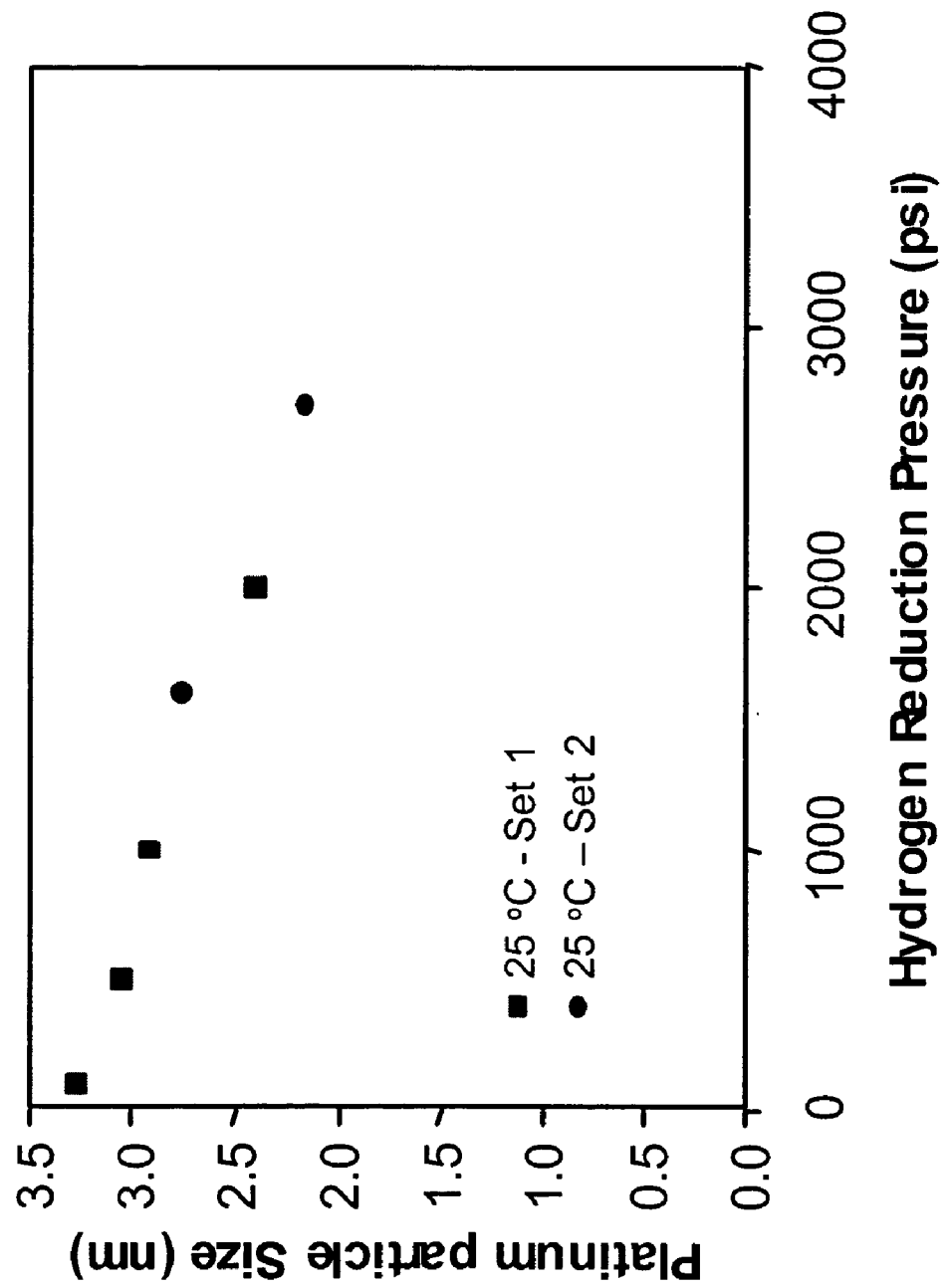
FIG. 6 is a graph depicting the effect of pressure of reduction on composition nanoparticle size from Example 2.

Upon venting the system, the reactors were opened and the samples analyzed via wide angle X-ray diffraction to measure crystallite size. This is shown in FIGS. 5 and 6. FIG. 6 shows an inverse correlation of average platinum particle size versus reduction pressure, up to approximately 3000 psi. Such ability to control platinum particle size is highly desirable in catalyst synthesis.

Example 3

Comparison of Traditional Solvent to Supercritical Solvent Deposition

The method of using a supercritical fluid was compared to using a traditional solvent to deposit the organometallic.

To compare the two methods, the platinum organometallic was deposited onto carbon black using acetone. The reaction was performed by mixing 405.3 mg of CDX-975 carbon black (Columbian Chemicals Company, Marietta, Ga.), 113.5 mg of Pt(COD)Me$_2$ (Aldrich Chemicals), and 100 mL of acetone (Fisher Scientific) while stirring.

The acetone slowly evaporated and the resultant material was reduced with different pressures of hydrogen at 25° C., as previously described. In comparison to Example 2, the acetone process of this Example 3 provided platinum particle sizes of about 1–2 nm larger for equivalent H$_2$ reduction pressure.

Example 4

Platinum Recovery

In one example, different amounts of CDX-975 carbon black (Columbian Chemicals Company) and 1,5-cyclooctadiene dimethyl platinum (Aldrich Chemicals) (Pt(COD)Me$_2$) were added to a stainless steel reactor and sealed. The reactor was then placed in a constant temperature bath at 60° C. Coleman grade carbon dioxide (Holox) was added to the reactor via a computer controlled syringe pump (ISCO) to a final pressure of 2000 psi. The samples were allowed to soak, with stirring, for 70 hours, after which the solution was vented through an activated carbon bed to atmospheric pressure. Hydrogen (Holox) was then added to the reactor via a pressure drop of a high-pressure manifold to an effective pressure of 600 psi for 1 hour at 60° C. Upon venting the system, the reactor was opened and the sample was analyzed via wide angle X-ray diffraction, transmission electron microscopy (TEM), and ash analysis.

The table below shows the amounts of carbon black and organometallic used. The theoretical percent platinum was calculated assuming 100% conversion on the reduction of the organometallic. Ash residue was measured by ashing via TGA. For the small amount of material used, the agreement is good, as the ash level determined for these small amounts will have a certain amount of noise.

TABLE 3

Percent theoretical and ash residue.

| Sample | Carbon black (mg) | Pt(COD)Me$_2$ (mg) | Percent Pt$^0$ Theoretical | Ash residue (percent) |
|---|---|---|---|---|
| 1 | 47.8 | 15.2 | 15.7 | 14.45 |
| 2 | 48.6 | 20.3 | 19.7 | 15.23 |
| 3 | 54.6 | 27.7 | 22.9 | 15.93 |
| 4 | 50.9 | 45.2 | 34.2 | 29.39 |
| 5 | 52.7 | 11.6 | 11.4 | 15.80 |
| 6 | 50.8 | 39.2 | 31.1 | 20.59 |

Example 5

Platinum-Ruthenium Deposition on Carbon Black

An example of the potential for mixed metal systems is presented here. In this example, 52.7 mg of CDX-975 carbon black (Columbian Chemicals Company), 25.0 mg of 1,5-cyclooctadiene dimethyl platinum (Strem Chemicals, Newburyport, Mass.) [Pt(COD)Me$_2$], and ruthenium acetylacetonate (Strem Chemicals) [Ru(acac)$_3$] were added to a stainless steel reactor and sealed. The reactor was then placed in a constant temperature bath at 60° C. Coleman grade carbon dioxide (Holox) was added to the reactor via a computer controlled syringe pump (ISCO) to a final pressure of 3000 psi. The sample was allowed to soak, with stirring, for 20 hours, after which the solution was vented through an activated carbon bed to atmospheric pressure. Hydrogen (Holox) was then added to the reactor via a pressure drop of a high-pressure manifold to an effective pressure of 3800 psi for 1 hour at 80° C. Upon venting the system, the reactor was opened and the sample was analyzed via wide angle X-ray diffraction and ash analysis.

Figure 7:
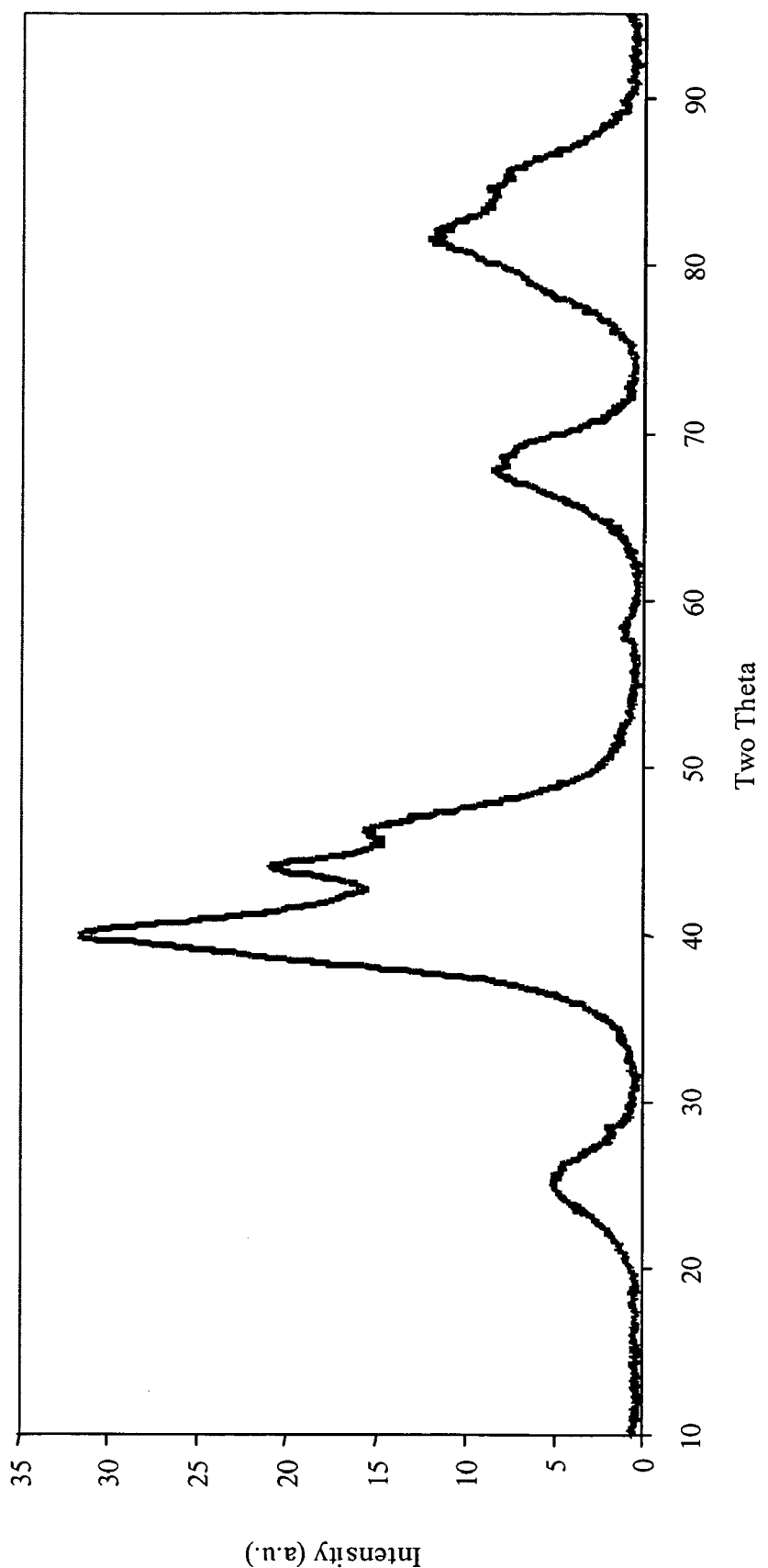
FIG. 7 is X-ray diffraction pattern of a composition comprising platinum and ruthenium on carbon black from Example 5.

The X-ray analysis shows two distinct metal peaks. One is for the platinum (111) and at 40 degrees two theta and one for the ruthenium (111) peak at 44 degrees two theta as shown in FIG. 7. The theoretical metal was 28.5% and that ash determined by TGA was 25.08%.

Example 6

Deposition of Silver on Carbon Black

As an example of the method with non-noble metal nanoparticles deposited onto particulates, silver was deposited onto carbon black. In this example, 52.5 mg of CDX-975 carbon black (Columbian Chemicals Company) and 40.3 mg of (1,5-cyclooctadiene) (hexafluoroacetylacetonato) silver [Ag(COD)hfac] (Aldrich Chemicals) were added to a stainless steel reactor and sealed. The reactor was then placed in a constant temperature bath at 60° C. Coleman grade carbon dioxide (Holox) was added to the reactor via a computer controlled syringe pump (ISCO) to a final pressure of 2000 psi. The sample was allowed to soak for 24 hours, after which the solution was vented through an activated carbon bed to atmospheric pressure. Hydrogen (Holox) was then added to the reactor via a pressure drop of a high-pressure manifold to an effective pressure of 2300 psi and allowed to soak for 1 hour at 25° C. Upon venting the system, the reactor was opened and the sample was analyzed via wide angle X-ray diffraction and transmission electron microscopy (TEM).

Figure 8:
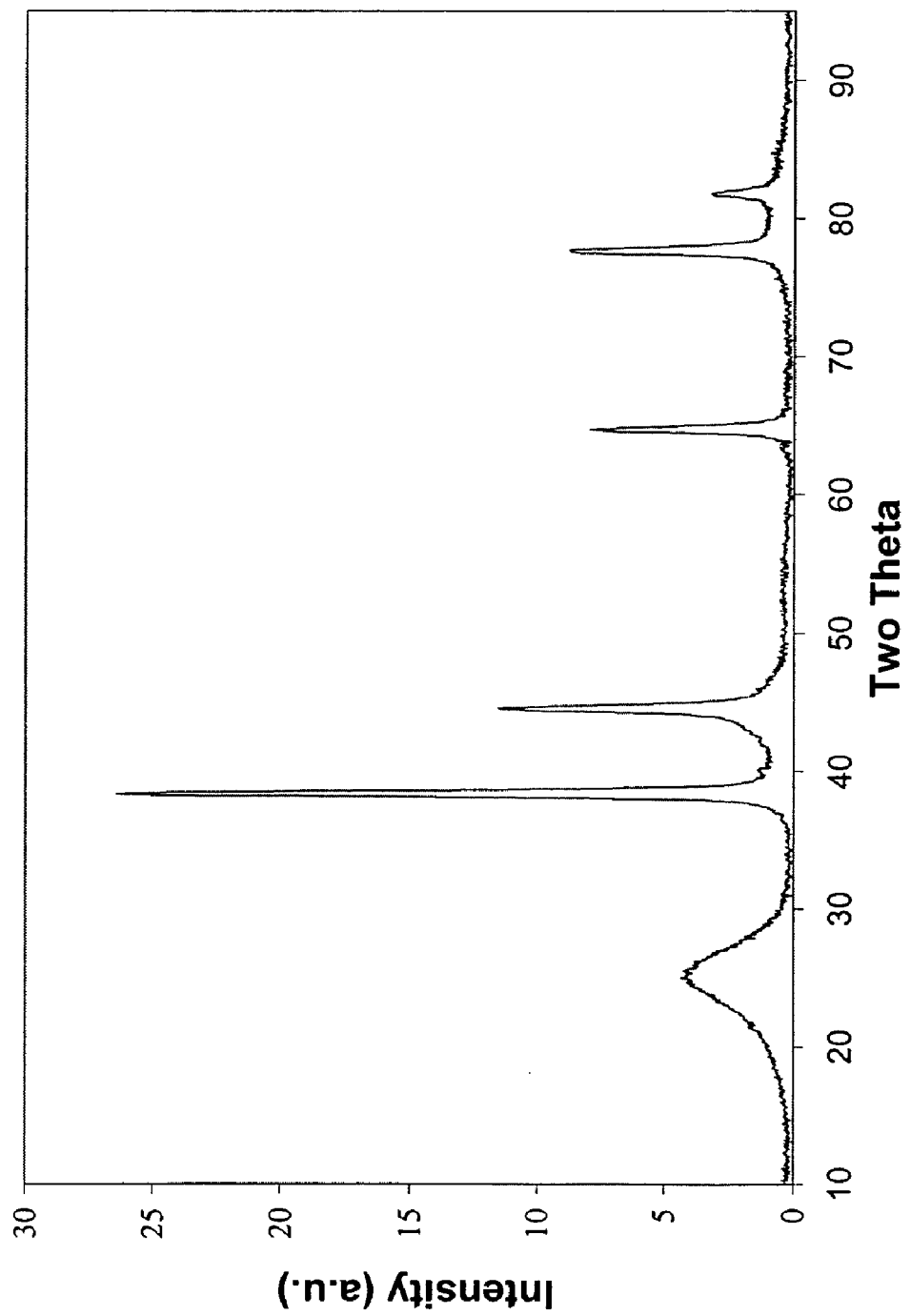
FIG. 8 is an X-ray diffraction pattern of a composition comprising silver nanoparticles on carbon black from Example 6.
Figure 9:
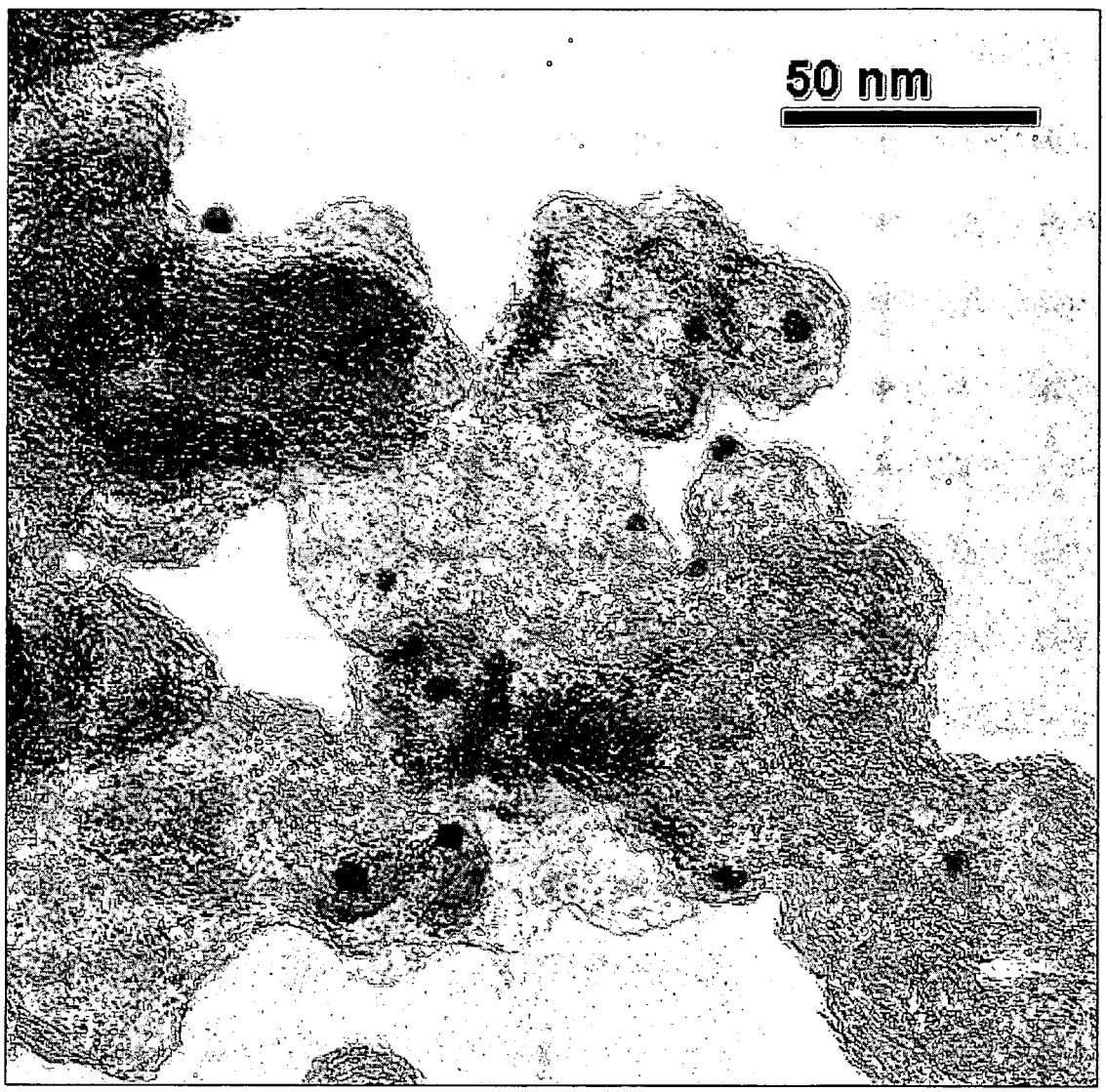
FIG. 9 is a TEM image of a composition from Example 6 comprising silver nanoparticles on carbon black on a 50 nm scale.

Wide-angle X-ray diffraction results are show in FIG. 8 which shows evidence of silver metal by the silver (111) peak at 38.3 degrees two theta. A TEM micrograph is shown in FIG. 9.

Example 7

Deposition of Pt on Alumina and Silicon Dioxide

Figure 10:
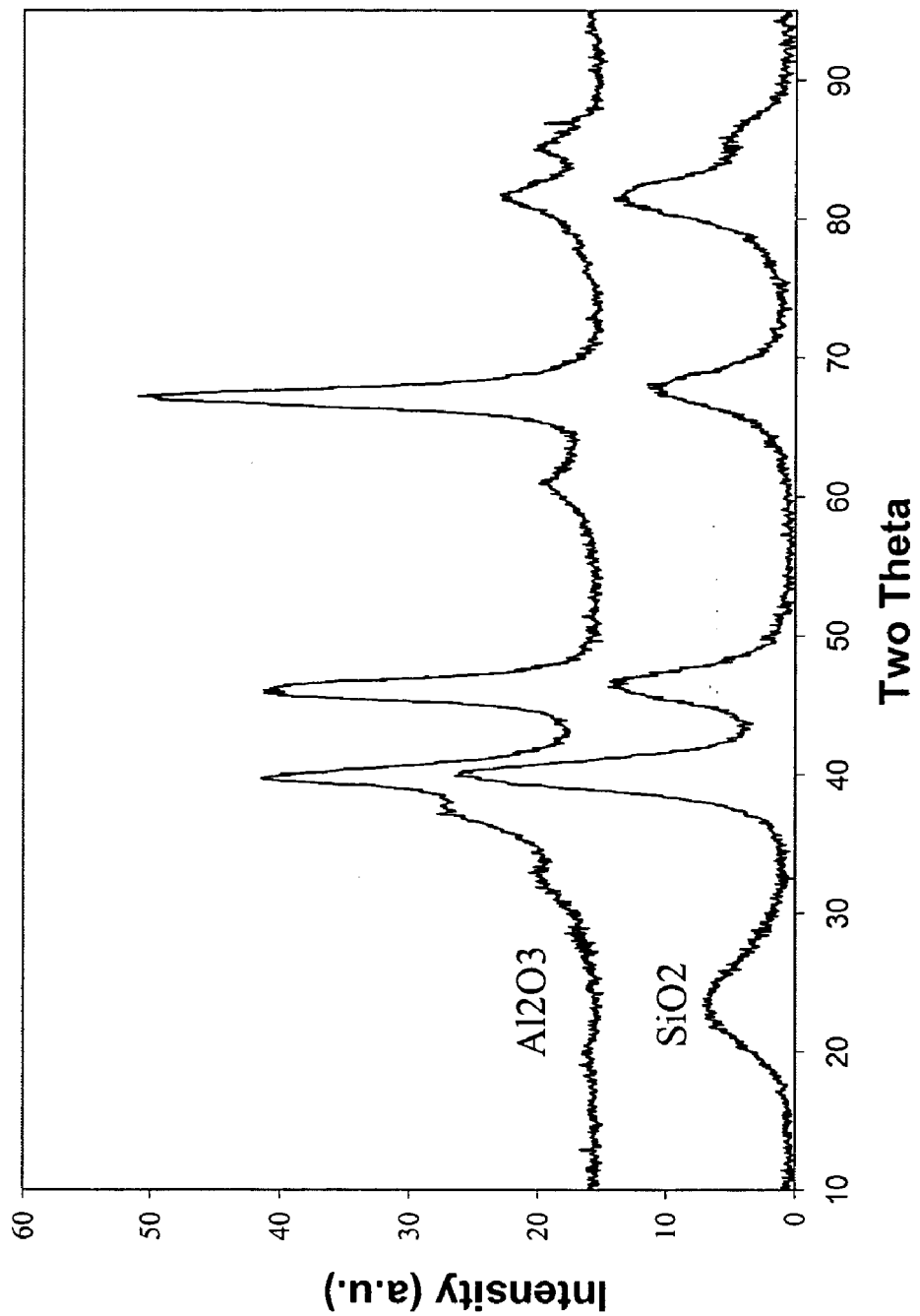
FIG. 10 are X-ray diffraction patterns of platinum supported on two powdered substrates, aluminum oxide ($Al_2O_3$) and silicon dioxide ($SiO_2$), from Example 7.
Figure 11:
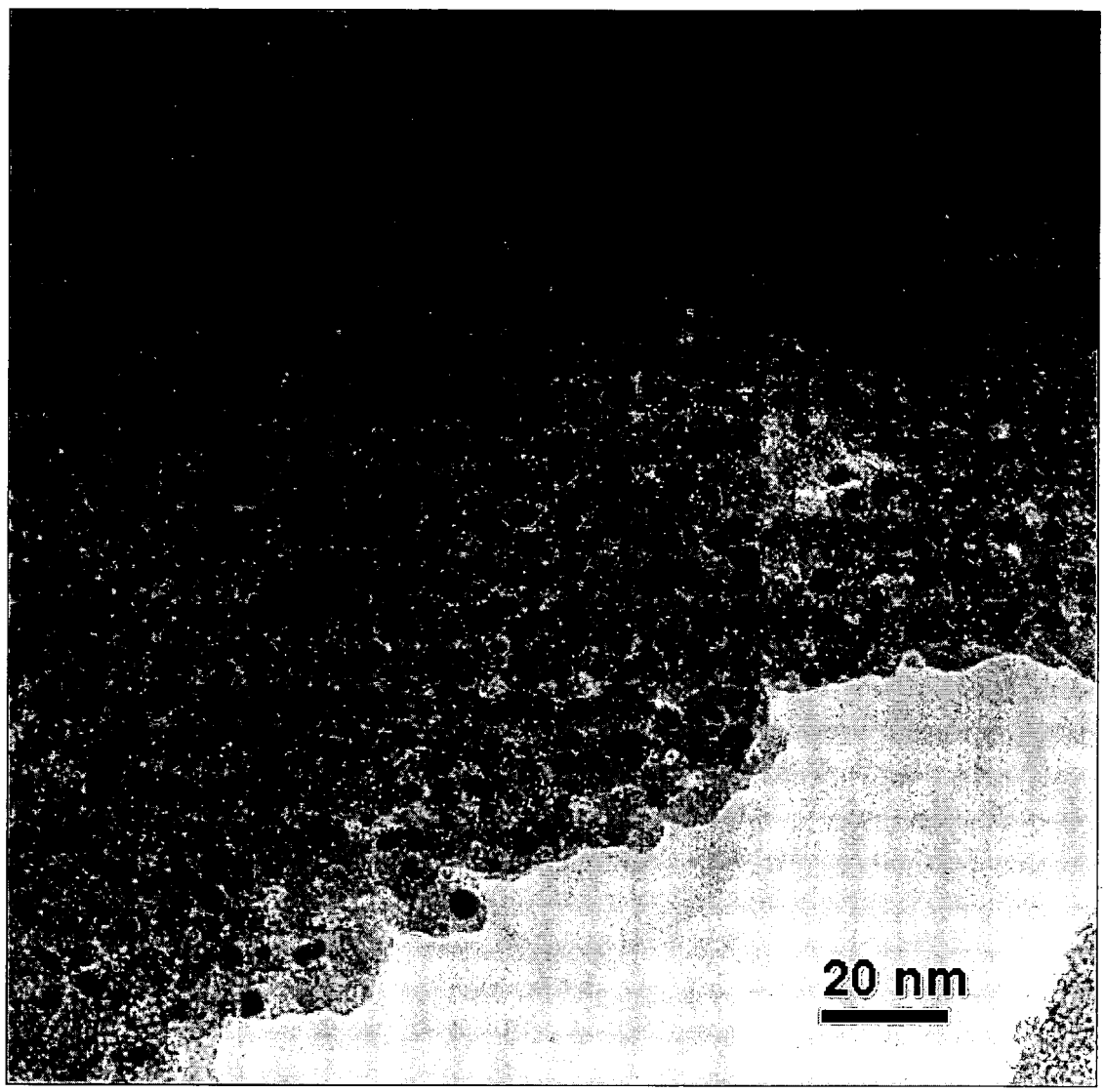
FIG. 11 is a TEM image of a composition comprising platinum nanoparticles on silicon dioxide on a 20 nm scale from Example 7.
Figure 12:
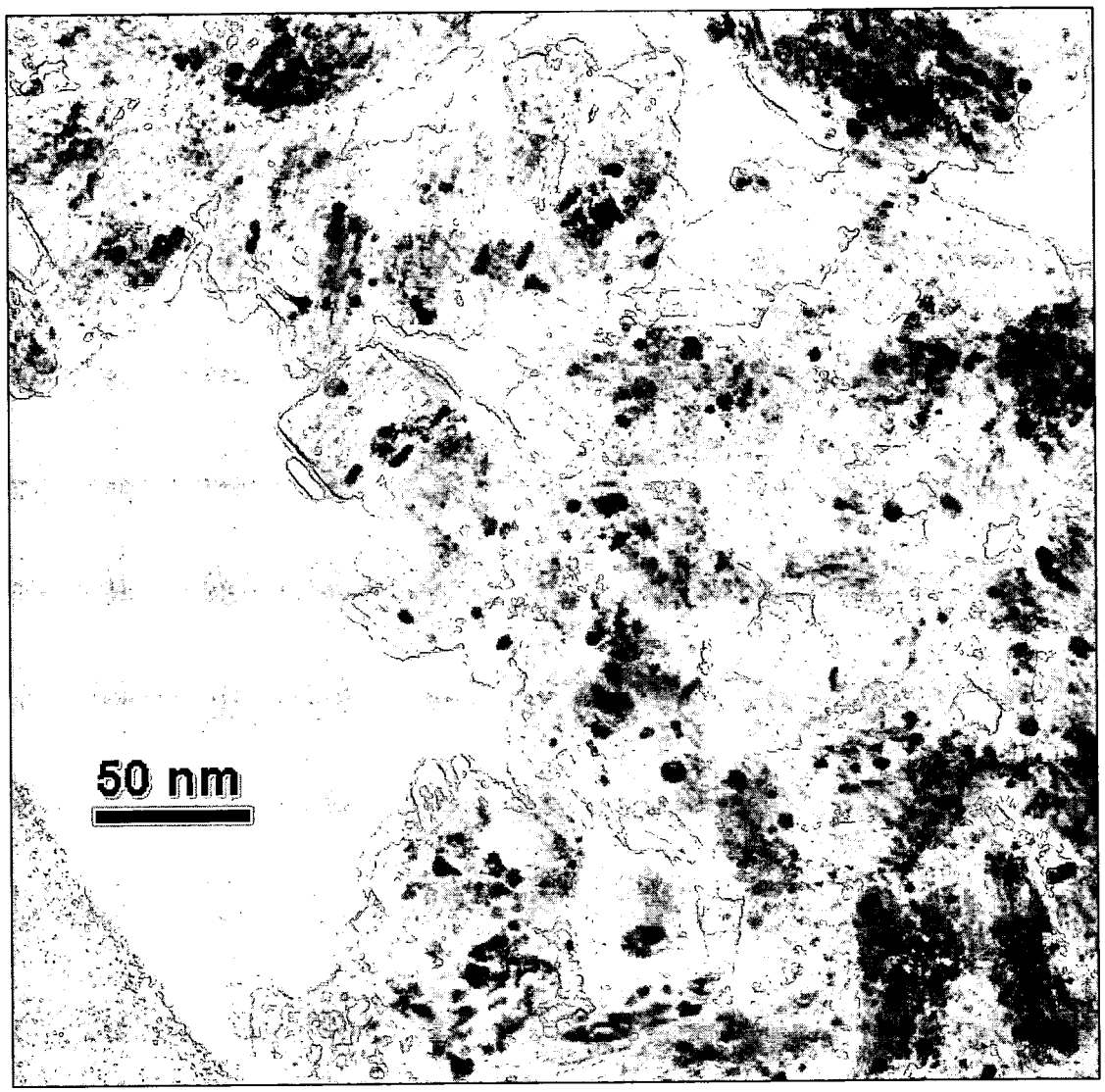
FIG. 12 is a TEM image of a composition comprising platinum nanoparticles on alumina on a 50 nm scale from Example 7.

In two other examples, platinum nanoparticles were deposited onto non-carbon black materials, silicon dioxide ($SiO_2$) and alumina ($Al_2O_3$). Powered substrates and platinum precursor, $Pt(COD)Me_2$, were added to separate stainless steel reactors and sealed, with the amounts of materials used shown in Table 4. The reactors were then placed in a constant temperature bath at 60° C. Coleman grade carbon dioxide (Holox) was added to the reactors via a computer controlled syringe pump (ISCO) to a final pressure of 2000 psi. The samples were allowed to soak for 24 hours, after which the solution was vented through an activated carbon bed to atmospheric pressure. Hydrogen (Holox) was then added to the reactors via a pressure drop of a high-pressure manifold to an effective pressure of 2300 psi and allowed to soak for 1 hour at 25° C. Upon venting the system, the reactors were opened and the sample was analyzed via wide-angle X-ray diffraction and transmission electron microscopy (TEM) as shown in FIG. 10–FIG. 12. FIG. 10 confirms the presence of Pt on the alumina and silica substrates respectively. FIGS. 11 and 12 illustrate the dispersion obtained.

TABLE 4

Materials used for platinum metal deposition on non-carbon black substrates

| Substrate | Wt of Substrate (mg) | $Pt(COD)Me_2$ (mg) |
|---|---|---|
| $SiO_2$ | 114.2 | 21.5 |
| $Al_2O_3$ | 70.5 | 22.1 |

Example 8

Electrochemically Active Surface Area of the Material

Approximately 40 mg of the platinum on carbon samples as prepared according to this invention using a procedure analogous to Example 1 was mixed with Nafion 1100 (Aldrich) and triethylphosphate (Aldrich). The resulting mixture was applied (drop cast) onto the surface of a glassy carbon electrode. Voltammetry was performed in 1.0M $H_2SO_4$ at 25 mV/sec against a Ag/AgCl reference electrode. Voltammograms were obtained both prior to and subsequent to exposure to carbon monoxide. After exposure, the charge passed during the CO stripping wave was integrated. This value was used to calculate an electrochemically active surface area of 47.3 $m^2/g$, indicating the product to be viable for electrochemical applications.

Throughout this application, various publications are referenced. The disclosures of these publications in their entireties are hereby incorporated by reference into this application in order to more fully describe the state of the art to which this invention pertains.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for producing metal particles or mixed metal particles dispersed on a particulate substrate comprising
   a. exposing an organometallic and the particulate substrate to a supercritical or near supercritical fluid under conditions to form a mixture of the fluid and the organometallic,
   b. allowing the mixture to remain in contact with the substrate for a time sufficient to deposit dispersed organometallic onto the substrate,
   c. venting the mixture,
   d. thereby adsorbing the organometallic onto the substrate, and then
   e. reducing the dispersed organometallic to dispersed metal particles with a reducing agent.

2. The method of claim 1, wherein the substrate comprises a carbonaceous material.

3. The method of claim 2, wherein the carbonaceous substrate comprises carbon black, graphite, nanocarbons, fullerenes, finely divided carbon, or mixtures thereof.

4. The method of claim 2, wherein the carbonaceous substrate comprises carbon black.

5. The method of claim 2, wherein the metal particles are nanoparticles.

6. The method of claim 1, wherein the organometallic comprises 1,5-cyclooctadiene dimethyl platinum [$Pt(COD)Me_2$], (1,5-cyclooctadiene) (hexafluoroacetylacetonato) silver [Ag(COD)hfac], ruthenium acetylacetonate [$Ru(acac)_3$], or Ag(acac), or a mixture thereof.

7. The method of claim 1, wherein the metal particles are nanoparticles.

8. The method of claim 7, wherein the nanoparticles are less than 10 nm in average diameter.

9. The method of claim 7, wherein the nanoparticles are about 0.5 nm to about 10 nm in average diameter.

10. The method of claim 7, wherein the nanoparticles are about 0.5 nm to about 5 nm in average diameter.

11. The method of claim 1, wherein the metal particles are noble metal particles.

12. The method of claim 1, wherein the metal particles comprise platinum, iridium, osmium, rhenium, ruthenium, rhodium, palladium, vanadium, chromium, gold, silver, nickel, cobalt, or a mixture thereof, or an alloy thereof.

13. The method of claim 1, wherein the metal particles comprise platinum.

14. The method of claim 1, wherein the metal particles comprise silver.

15. The method of claim 1, wherein the metal particles comprise ruthenium.

16. The method of claim 1, wherein the metal particles are mixed metal particles.

17. The method of claim 1, wherein the fluid comprises carbon dioxide, ethane, ethylene, propane, propylene, chlorotrifluoromethane, or ammonia.

18. The method of claim 1, wherein the fluid comprises carbon dioxide.

19. The method of claim 1, wherein the reducing is by addition of a reducing agent.

20. The method of claim 19, wherein the reducing agent comprises hydrogen, hydrogen sulfide, formaldehyde, sodium borohydride, hydrazine, hydroxylamine, or a combination thereof.

21. The method of claim 19, wherein the reducing agent comprises gaseous hydrogen.

22. The method of claim 1, wherein the reducing is under pressure.

23. The method of claim 22, wherein the pressure controls the metal particle size.

24. The method of claim 1, wherein the organometallic is adsorbed while in the mixture.

25. The method of claim 1, wherein the organometallic is adsorbed when the mixture is vented.

26. The method of claim 1, wherein in step (a), at least some of the organometallic dissolves in the fluid.

27. The method of claim 1, wherein in step (a), all or substantially all of the organometallic dissolves in the fluid.

28. The method of claim 1, wherein the method produces a supported particulate catalyst suitable for use in a fuel cell.

29. The method of claim 1, wherein the method is for producing a supported particulate catalyst for use in a fuel cell with a controlled catalyst particle size, wherein the method further comprises in step (e),
   e. reducing the dispersed organometallic to dispersed metal particles with a reducing agent under pressure conditions effective to form the desired particle size thereby forming a supported particulate catalyst with controlled metal particle size.

30. A method for producing particulate substrate-supported dispersed metallic particles comprising
   a. mixing an organometallic in a supercritical or near supercritical fluid to form a mixture,
   b. exposing a particulate substrate to the mixture of a) under supercritical or near supercritical conditions for a period of time sufficient to deposit dispersed organometallic on the substrate,
   c. venting the mixture,
   d. thereby adsorbing the organometallic onto the substrate, and then
   e. reducing the organometallic to dispersed metal particles with a reducing agent.

31. A method for producing particulate substrate-supported dispersed metallic particles comprising
   a. adding a particulate substrate and an organometallic to a reactor,
   b. adding a supercritical fluid to the reactor to form a mixture with the organometallic,
   c. allowing the organometallic to remain in contact with the substrate for a time sufficient to deposit dispersed organometallic onto the substrate,
   d. venting the reactor,
   e. thereby adsorbing the organometallic onto the substrate, and then
   f. adding a gaseous reducing agent to the reactor, and
   g. contacting the reducing agent and organometallic until the organometallic is reduced to dispersed metal particles.

* * * * *